US012619401B2

(12) United States Patent
    Klaedtke

(10) Patent No.: US 12,619,401 B2
(45) Date of Patent: May 5, 2026

(54) PROTECTING AND ATTESTING PROGRAM EXECUTIONS THROUGH SHADOW PROGRAMS

(71) Applicant: NEC Laboratories Europe GmbH, Heidelberg (DE)

(72) Inventor: Felix Klaedtke, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 303 days.

(21) Appl. No.: 18/413,088

(22) Filed: Jan. 16, 2024

(65) Prior Publication Data

US 2025/0173129 A1     May 29, 2025

Related U.S. Application Data

(60) Provisional application No. 63/602,669, filed on Nov. 27, 2023.

(51) Int. Cl.
    *G06F 8/36*        (2018.01)
    *G06F 8/41*        (2018.01)
(52) U.S. Cl.
    CPC ................ *G06F 8/36* (2013.01); *G06F 8/433* (2013.01)
(58) Field of Classification Search
    None
    See application file for complete search history.

(56) References Cited

U.S. PATENT DOCUMENTS

| | | | | |
|---|---|---|---|---|
| 9,092,569 B2 * | 7/2015 | Vechev | ................... | G06F 8/436 |
| 10,482,262 B2 * | 11/2019 | Sharma | ................... | G06F 21/14 |
| 11,640,352 B2 * | 5/2023 | Moondhra | .......... | G06F 11/3684 |
| | | | | 717/124 |
| 2019/0121979 A1 * | 4/2019 | Chari | ...................... | G06F 8/433 |
| 2020/0143043 A1 * | 5/2020 | Hong | .................... | G06F 21/566 |
| 2022/0215098 A1 * | 7/2022 | Li | ........................... | G06F 21/57 |
| 2025/0173129 A1 * | 5/2025 | Klaedtke | ................ | G06F 8/433 |

FOREIGN PATENT DOCUMENTS

| | | |
|---|---|---|
| CN | 219246099 U | 6/2023 |

OTHER PUBLICATIONS

Chowdhary, "Parallel Shadow Execution to Accelerate the Debugging of Numerical Errors", 2021, ACM (Year: 2021).*
Abadi, "Control-Flow Integrity Principles, Implementations, and Applications", 2009, ACM (Year: 2009).*

(Continued)

*Primary Examiner* — Hossain M Morshed

(74) *Attorney, Agent, or Firm* — Leydig, Voit & Mayer, Ltd.

(57)        ABSTRACT

A computer-implemented method for remotely attesting program executions includes obtaining, by a verifier computing entity, a program associated with an original program, for example a shadow program. The method further includes obtaining, by the verifier computing entity, collected information associated with control-flow operations executed by an instrumented program, wherein the instrumented program is a variation of the original program. The verifier computing entity executes the program associated with the original program based on the collected information, and checks an output of the program associated with the original program.

16 Claims, 14 Drawing Sheets

(56)              References Cited

OTHER PUBLICATIONS

Abera, Tigist et al.; "C-Flat: Control-Flow Attestation for Embedded Systems Software"; *Proceedings of the 2016 ACM SIGSAC Conference on Computer and Communications Security*, Aug. 17, 2016; pp. 743-754; vol. 2; ArXiv.org, Cornell University; Ithaca, NY, USA.

Ahmad, Adil; "Defeating Critical Threats to Cloud User Data in Trusted Execution Environments"; *Dissertation for the degree of Doctor of Philosophy—Department of Computer Science*; Jul. 26, 2022; pp. 1-24; Purdue University; West Lafayette, IN; USA.

Chowdhary, Sangeeta; "Fast Methods to Detect and Debug Numerical Errors with Shadow Execution"; *Dissertation for the degree of Doctor of Philosophy—Graduate Program in Computer Science*; Oct. 1, 2022; pp. 1-154; Rutgers University; New Brunswick, NJ, USA.

Chowdhary, Sangeeta et al.; "Parallel Shadow Execution to Accelerate the Debugging of Numerical Errors"; *Proceedings of the 29th ACM Joint European Software Engineering Conference and Symposium on the Foundations of Software Engineering*; Aug. 18, 2021; pp. 615-626; ACM Publications; New York, NY, USA.

Christophe, Laurent et al.; "Linvail: A General-Purpose Platform for Shadow Execution of JavaScript"; *2016 IEEE 23rd International Conference on Software Analysis, Evolution, and Reengineering*; May 23, 2016; pp. 1-11; IEEE; Piscataway, NJ, USA.

Kuchta, Tomasz et al.; "Shadow Symbolic Execution for Testing Software Patches"; *2018 ACM Transactions on Software Engineering and Methodology*; Sep. 25, 2018; pp. 1-32; vol. 27, No. 3, Art. No. 10; ACM Publications; New York, NY, USA.

Morbitzer, Mathias et al.; "GuaranTEE: Introducing Control-Flow Attestation for Trusted Execution Environments"; *2023 IEEE 16th International Conference on Cloud Computing*; May 6, 2022; pp. 1-13; vol. 2; ArXiv.org, Cornell University; Ithaca, NY, USA.

Sun, Zhichuang et al.; "OAT: Attesting Operation Integrity of Embedded Devices"; *2020 IEEE Symposium on Security and Privacy*, Oct. 1, 2019; pp. 1433-1449; vol. 3; ArXiv.org, Cornell University; Ithaca, NY, USA.

Wang, Yuxin et al.; "Proving Differential Privacy with Shadow Execution"; *Proceedings of the 40th ACM SIGPLAN Conference on Programming Language Design and Implementation*; Jul. 1, 2019; pp. 655-669; vol. 2; ArXiv.org, Cornell University; Ithaca, NY, USA.

Zhang, Yumei et al.; "ReCFA: Resilient Control-Flow Attestation"; *Proceedings of the 37th Annual Computer Security Applications Conference*; Dec. 11, 2021; pp. 311-322; vol. 3; ArXiv.org, Cornell University; Ithaca, NY, USA.

* cited by examiner

100

200

300

400

500

600

700

1000

1100

1300

1400

Processor(s)    1402

Memory    1404

I/O    1406

Sensor(s)    1408

UI(s)    1410

Actuator(s)    1412

PROTECTING AND ATTESTING PROGRAM EXECUTIONS THROUGH SHADOW PROGRAMS

CROSS-REFERENCE TO PRIOR APPLICATION

Priority is claimed to U.S. Provisional Application Ser. No. 63/602,669 filed on Nov. 27, 2023, the entire contents of which is hereby incorporated by reference herein.

FIELD

The present invention relates to a method, system, data structure, computer program product and computer-readable medium for protecting and attesting program executions.

BACKGROUND

In Internet-of-Things (IoT) deployments and in cloud computing, computations are often carried out on various devices that are remote to each other and many of them operate in untrusted environments. For instance, in IoT applications, devices are often deployed at untrusted locations, where they record data or perform actions that are requested by a remote controller. Analogously, in cloud computing, data centers often host services from multiple entities, which neither trust each other nor the data center owner. These services may store and analyze sensitive data. A compromised device or service may forge data or hijack operations, which can lead to all sorts of system malfunctions, including data leakage, ill-classifications, outages, and device defects.

SUMMARY

In an embodiment, the present disclosure provides a computer-implemented method for remotely attesting program executions. The method includes obtaining, by a verifier computing entity, a program associated with an original program, for example a shadow program. The method further includes obtaining, by the verifier computing entity, collected information associated with control-flow operations executed by an instrumented program, wherein the instrumented program is a variation of the original program. The verifier computing entity executes the program associated with the original program based on the collected information, and checks an output of the program associated with the original program.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
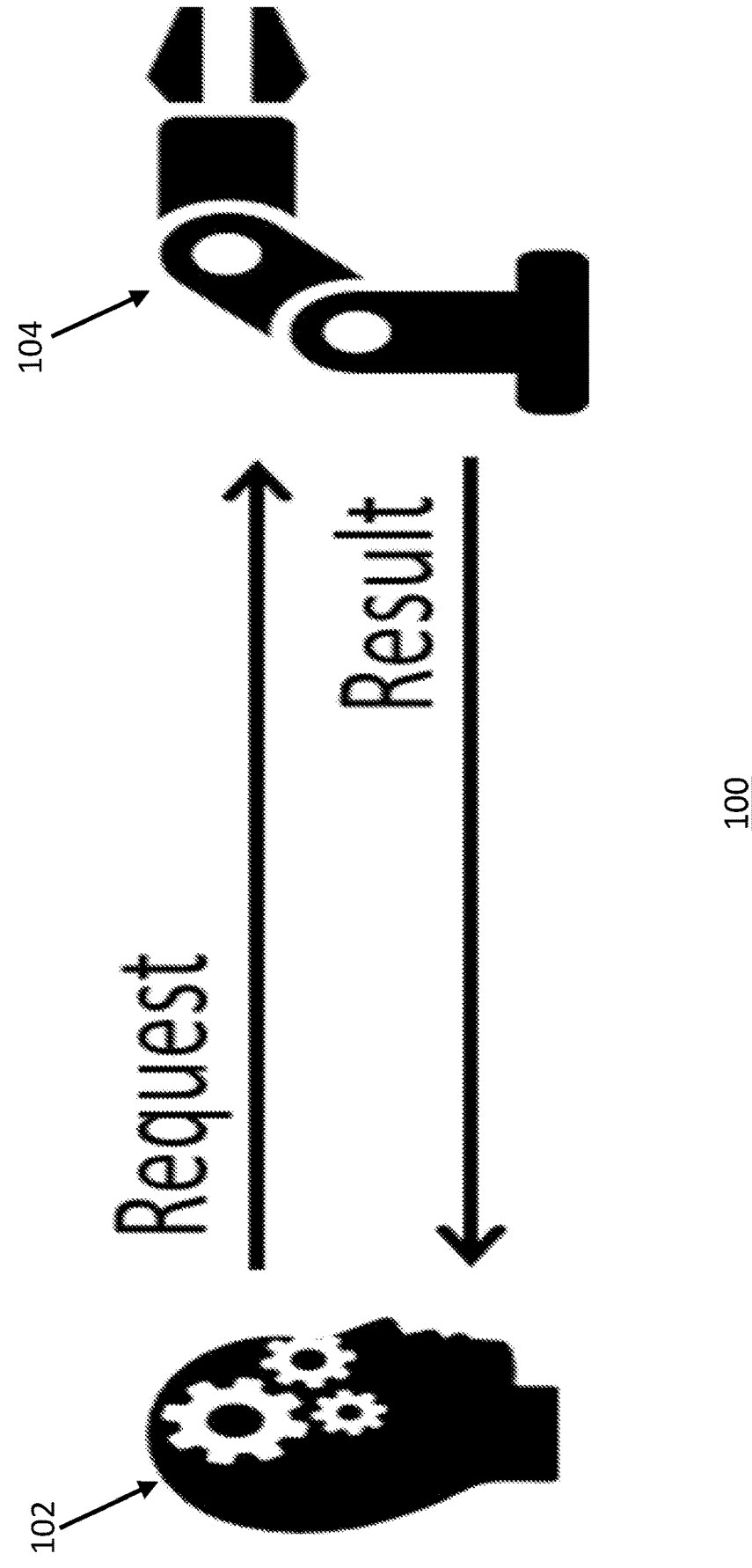
FIG. 1 illustrates a setting of an embodiment of the present invention.

Embodiments of the present invention provide an approach to protect and attest the executions of programs, which can detect control-data attacks as well as non-control-data attacks. During program execution, information about the execution is collected, which is then checked with a so-called shadow program by a trusted entity. Shadow programs are program abstractions with a matching control-flow graph, but with a much simpler state space omitting irrelevant details and using less computational resources.

Embodiments of the present invention provide solutions to the technical challenge of verifying that requested operations are performed properly to protect remote entities against manipulations from compromised devices and services. In particular, embodiments of the present invention enable to identify disruptive operations and allow entities to take appropriate countermeasures. For instance, data from the respective service or device can be flagged as potentially corrupted. Additionally, and/or alternatively, the device or service can be reset or quarantined.

The approach for attesting the operations of a remote device or service according to embodiments of the present invention allows a remote entity to verify that the software for performing an operation was executed correctly. This includes, e.g., that an attacker did not hijack the control flow of the code responsible for carrying out the operation. It also includes that the execution fulfills certain temporal properties on the state variables, possibly different from the program counter.

Embodiments of the present invention also provide solutions to the technical problem that software, even today, is often written in unsafe programming languages such as C or C++ that is vulnerable to corruption and leakage. These languages provide no or little support for avoiding bugs that, e.g., allow one to write data to unintended memory locations. Consequently, software written in these languages is often vulnerable. For instance, control-flow hijacking attacks may exploit buffer overflows to overwrite a return address or a function pointer. A buffer overflow may also be exploited by overwriting a critical data value without deviating the program's control flow but causing the leakage of sensitive data. The reason of the use of these unsafe programming languages is manifold, including tool and library support, legacy code, performance, and/or low-level and embedded programming. In particular, many IoT devices and performance critical services execute software that is compiled from C or C++ code. Overall, it is unlikely that the situation of using languages such as C or C++ will considerably change in the near foreseeable future.

In a first aspect, the present disclosure provides a computer-implemented method for remotely attesting program executions. The method includes obtaining, by a verifier computing entity, a program associated with an original program, for example a shadow program. The method further includes obtaining, by the verifier computing entity, collected information associated with control-flow operations executed by an instrumented program, wherein the instrumented program is a variation of the original program. The verifier computing entity executes the program associated with the original program based on the collected information, and checks an output of the program associated with the original program.

In a second aspect, the present disclosure provides the method according to the first aspect, wherein obtaining the program associated with the original program comprises obtaining a shadow program that mimics a control flow of the original program, and wherein executing the program associated with the original program comprises executing the shadow program based on the collected information.

In a third aspect, the present disclosure provides the method according to the first or second aspect, wherein a prover computing entity comprises a first execution environment and a second execution environment, wherein the first execution environment executes the instrumented program and invokes a tracer from the second execution environment to collect the collected information in an attestation blob, and wherein the prover computing entity provides the attestation blob comprising the collected information to the verifier computing entity, and/or wherein the verifier computing entity is a controller that coordinates operation of a plurality of robotic devices, a plurality of internet of things (IoT) devices, and/or a cloud server, wherein the method further comprises providing one or more instructions to reset one or more of the plurality of robotic devices, the plurality of IoT devices, and/or the cloud server based on the output of the shadow program.

In a fourth aspect, the present disclosure provides the method according to any of the first to third aspects, further comprising: building the instrumented program by incorporating one or more trampolines into the original program, wherein each of the one or more trampolines is associated with the control-flow operations of the original program; and building the shadow program by modifying the control-flow operations of the original program.

In a fifth aspect, the present disclosure provides the method according to any of the first to fourth aspects, wherein building the instrumented program comprises: including a new initialization step within the original program, wherein the new initialization step is configured to establish a connection to a tracer of a trusted environment of a prover computing entity; including one or more attestation steps within the original program, wherein the one or more attestation steps are configured to notify the tracer of a request and notify the tracer of completion of the request; and modifying a server request step by incorporating the one or more trampolines.

In a sixth aspect, the present disclosure provides the method according to any of the first to fifth aspects, wherein the one or more trampolines is associated with a conditional branch instruction from the original program, and wherein the collected information indicates a truth value of the conditional branch that is obtained based on the one or more trampolines calling a first library function and invoking the tracer.

In a seventh aspect, the present disclosure provides the method according to any of the first to sixth aspects, wherein the one or more trampolines is associated with an indirect call or jump instruction from the original program and a return instruction from the original program, and wherein the collected information indicates a target address that is obtained based on the one or more trampolines a second library function and invoking the tracer and a return address that is obtained based on the one or more trampolines a third library function and invoking the tracer.

In an eighth aspect, the present disclosure provides the method according to any of the first to seventh aspects, wherein executing the shadow program comprises: initializing one or more memory address mappings between the shadow program and the instrumented program; awaiting an attestation blob comprising the collected information; and based on receiving the attestation blob from the verifier computing entity, attesting execution of the instrumented program by a prover computing entity.

In a ninth aspect, the present disclosure provides the method according to any of the first to eighth aspects, wherein initializing the one or more memory address mappings comprises: obtaining a first mapping that translates target addresses of indirect calls and jumps of the instrumented program to corresponding target addresses of the shadow program; and obtaining a second mapping that translates return addresses of the shadow program to corresponding return addresses of the instrumented program.

In a tenth aspect, the present disclosure provides the method according to any of the first to ninth aspects, wherein attesting the execution of the instrumented program comprises: translating one or more addresses between the shadow program and the original program based on the first mapping and/or the second mapping, and wherein checking the output of the shadow program is based on translating the one or more addresses.

In an eleventh aspect, the present disclosure provides the method according to any of the first to tenth aspects, wherein attesting the execution of the instrumented program comprises: based on detecting a conditional branch instruction, executing a first call function to obtain a truth value associated with the conditional branch instruction from the attestation blob; performing a test-and-branch instruction based on the truth value to test the conditional branch; and determining a result of the test of the conditional branch, wherein the output of the shadow program indicates the result of the test.

In a twelfth aspect, the present disclosure provides the method according to any of the first to eleventh aspects, wherein attesting the execution of the instrumented program comprises: based on detecting an indirect call or jump instruction, executing a second call function to read a next target address into a register from the attestation blob, translate the next target address into a corresponding target address of the shadow program, and return the corresponding target address in a register; based on detecting a return instruction, executing a third call function to translate a return address of the shadow program into a corresponding return address of the instrumented program, update a hash value with the corresponding return address, and comparing the hash value with a hash value from the attestation blob; and determining one or more results of the indirect call or jump instruction and the return instruction based on executing the second call function and the third call function.

In a thirteenth aspect, the present disclosure provides the method according to any of the first to twelfth aspects, wherein obtaining the program associated with the original program comprises: obtaining the original program or the instrumented program; and using an interpreter that directly uses the original program or the instrumented program, and wherein executing the program associated with the original program comprises using the interpreter that replays and checks an execution of the instrumented program based on the collected information.

In a fourteenth aspect, the present disclosure provides a computer system for remotely attesting program executions, the system comprising one or more hardware processors, which, alone or in combination, are configured to provide for execution of the method according to any of the first to thirteenth aspects.

In a fifteenth aspect, the present disclosure provides a tangible, non-transitory computer-readable medium having instructions thereon which, upon being executed by one or more processors, alone or in combination, provide for execution of the method for remotely attesting program executions according to any of the first to thirteenth aspects.

The setting in which one or more embodiments of the present invention apply can be depicted in FIG. 1. For example, FIG. 1 illustrates a setting 100 of an embodiment of the present invention. The setting 100 includes the entity L 102 on the left-hand side that makes (e.g., generates) a request to the entity R 104 on the right-hand side. The entity R 104 processes the request and sends the result back to the entity L 102.

In an IoT setting (e.g., an embodiment of the setting 100), the entity R 104 can be a device such as a robot arm as shown in FIG. 1, and the entity L 102 can be a controller that operates and/or coordinates multiple such robot arms (e.g., coordinate operation of multiple robot arms), including the entity L 102. In a cloud computing setting (e.g., another embodiment of the setting 100), the entity R 104 can be a service running inside a data center and the entity L 102 can be a node that queries the service by requesting certain data items. In both settings, the entities L and R 102, 104 are remote to each other. In an IoT setting, the entity R 104 has often limited computational power, whereas in the cloud computing setting, the entity R 104 runs on a server, but must often handle multiple requests from different entities in parallel. Hence, in both settings, the additional overhead for the entity R 104 for attesting the correct execution of handling a request from the entity L 102 is to be kept small.

At a high level, the approach according to embodiments of the present invention, which is described in detail below, for attesting the correct execution proceeds as follows. The entity R 104 collects information about how it handles the request, in particular, information about the execution of the program running at the entity R 104 that handles the request. To this end, the program code is instrumented prior to its execution. Furthermore, the entity R 104 can use trusted computing technologies to securely collect and protect the collected information. The execution result together with the collected information is sent back to the entity L 102, and the entity L 102 uses the obtained information to check whether the program was correctly executed by the entity R 104. As an extreme case, the entity L 102 can run the same program as the entity R 104 and check whether both executions match. However, this might be inefficient because the program can be executed twice and when the execution is not stateless, both the entities L and R 102, 104 must keep track of the program's state. Preferably, in some examples, instead, the entity L 102 uses an "abstract" version of the program that still allows the entity L 102 to perform the necessary checks, but can be executed with fewer computational resources than the original program.

Before providing details of the approach according to embodiments of the present invention, existing approaches and technical problems overcome by the approach according to embodiments of the present invention are discussed. First, static remote attestation solutions, which often rely on trusted hardware modules, are already commonly used to assess the integrity of devices and services by measuring their states. In particular, they allow a remote entity to check whether a service has been properly set up. This check includes the verification of the service's initial state. Various solutions and protocols exist for different central processing unit (CPU) platforms. For instance, INTEL offers CPUs with Software Guard eXtenstions (SGX) together with its attestation service based on Enhanced Privacy ID (EPID). However, static remote attestation does not protect against attacks that exploit runtime vulnerabilities of the installed software. It is a technical problem that software that, e.g., runs inside trusted execution environments (TEEs) such aqs SGX enclaves and for which an initial state has been checked, may still be vulnerable to runtime attacks (see J. Van Bulck, D. Oswald, E. Marin, A. Aldoseri, F. D. Garcia, and F. Piessens. A Tale of Two Worlds: Assessing the Vulnerability of Shielding Runtimes. 26th ACM Conference on Computer and Communications Security (CCS). ACM Press (2019), which is hereby incorporated by reference herein). Embodiments of the present invention provide dynamic remote attestation solutions that provide protection against attacks such as these. Static and dynamic remote attestation solutions complement each other.

Most existing dynamic remote attestation solutions focus on checking whether an execution of a program followed the program's control flow given by the program's control-flow graph (CFG). Hence, such solutions are referred to as control-flow attestation (CFA). For instance, in C-FLAT (see T. Abera, N. Asokan, L. Davi, J.-E. Ekberg, T. Nyman, A. Paverd, A.-R. Sadeghi, and G. Tsudik. C-FLAT: Control-flow attestation for embedded systems software. 23rd ACM Conference on Computer and Communications Security (CCS). ACM Press (2016), which is hereby incorporated by reference herein), the prover (e.g., the entity R 104 in FIG. 1 that runs the program) measures the program's execution and the verifier (e.g., the entity L 102 in FIG. 1 that makes the request) checks whether the measurement is included in a database that includes measurements of correct program executions. A measurement in C-FLAT is essentially a hash of the visited program locations. If the verifier does not find the measurement in the database, it assumes that the execution did not follow the program's control flow and takes appropriate actions such as terminating, resetting, or quarantining the service. For making the measurements during program execution, C-FLAT instruments the program prior to its execution. It adds so-called trampolines, which are small code snippets, to the program code that perform and combine the measurements. Furthermore, also prior to program execution, C-FLAT populates the database in an offline phase. This step is often a bottleneck, since already simple programs have many different executions, with different measurements. In fact, most programs have infinitely many executions. C-FLAT and later work propose various optimizations and heuristics to reduce the number of database entries. Instead of measuring a program's execution as in C-FLAT, in OAT (see Z. Sun, B. Feng, L. Lu, and S. Jha. OAT: Attesting Operation Integrity of Embedded Devices. 41st IEEE Symposium on Security and Privacy (SP). IEEE (2020), which is hereby incorporated by reference herein), the prover collects, during program execution, information about the execution in a so-called attestation blob. A blob includes information about the conditions of the conditional branch instructions and the addresses of the indirect calls. Namely, for each executed conditional branch instruction, a bit is saved whether the branch was taken or not, and for an indirect call, the address is saved. Only the return addresses of calls are hashed to a single measurement. Similar to C-FLAT, OAT instruments the code with trampolines to collect this information. In OAT, the verifier checks with the information from the attestation blob and the program whether the execution did follow the program's control flow. More concretely, the verifier disassembles the program and follows the instructions by using the information from the attestation blob such as the bits and addresses. By keeping track of the callers, the verifier also computes a hash when returning to the callees. At the end, the verifier checks whether the two return hashes match.

In contrast to OAT, embodiments of the present invention provide a more efficient verification step. Advantageously, embodiments of the present invention provide for the construction of an abstract version the original program that is executed natively on the verifier's node. This abstraction checks the correctness of executions given by attestation blobs. Furthermore, embodiments of the present invention enable the verifier to check and attest additional properties about a program's execution, limited to the program's control flow.

Control-flow attestation (CFA) has much in common with control-flow integrity (CFI) (see M. Abadi, M. Budiu, and U. Erlingsson. Control-flow integrity principles, implementations, and applications. ACM Transactions on Information and System Security, volume 13, issue 1. Article no. 4, pp. 1-40. ACM Press (2009), which is hereby incorporated by reference herein). Similar to CFA, CFI instruments the program code (usually at compile time). The added code checks whether the execution follows the program's control-flow graph. A deviation from the control flow usually results in the program's termination. In contrast to CFA, CFI checks the control flow on the node on which the program is installed and during its execution. CFA first measures an execution or collects information about an execution, which is then later remotely attested by a trusted entity. Furthermore, CFA often utilizes trusted execution environments for combining and collecting the execution's measurement or information. Thus, the settings of CFI and CFA differ.

Figure 2:
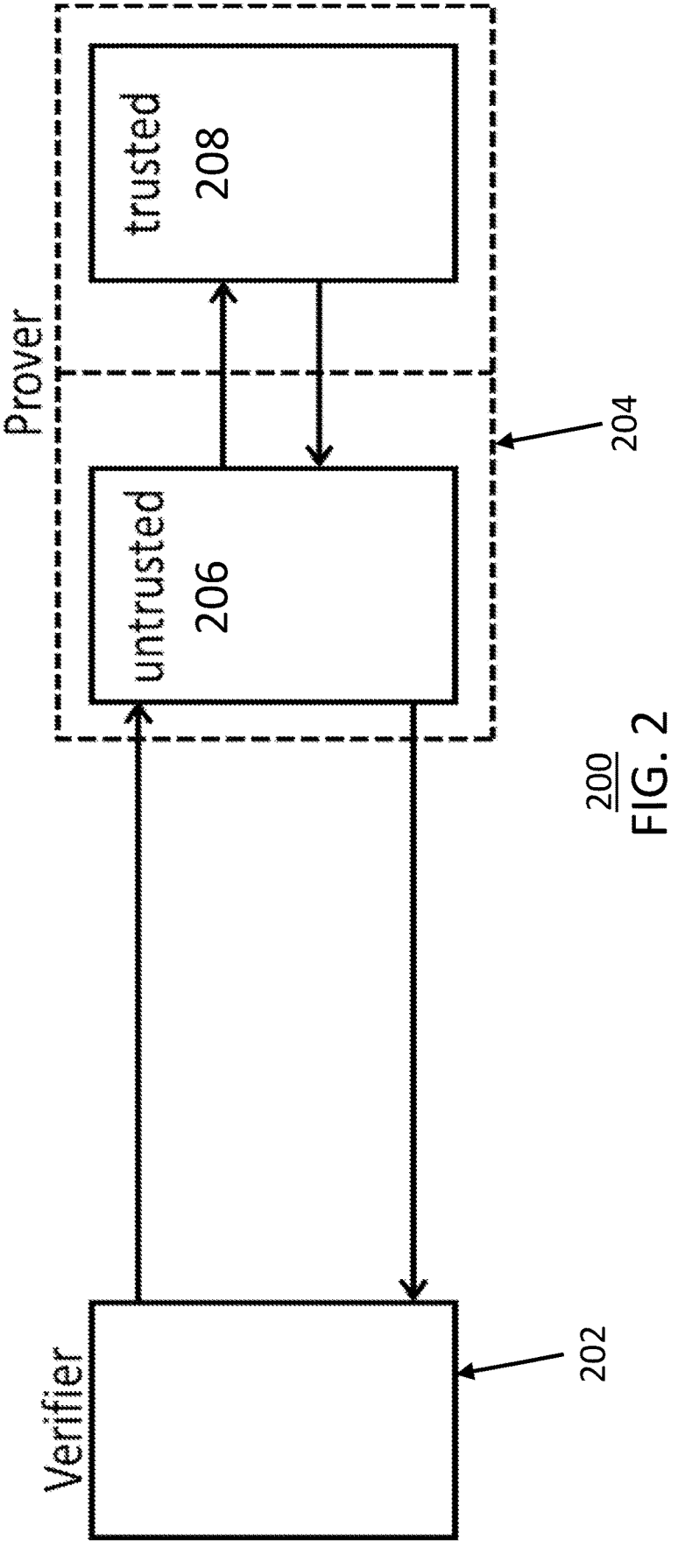
FIG. 2 illustrates a system and threat model according to an embodiment of the present invention.

In the following, the underlying system and threat model according to an exemplary embodiment of the present invention are first discussed, followed by some background and fixing of terminology. Finally, a method to attest operations of remote devices or services according to an exemplary embodiment of the present invention is described. System and Threat Model:

The overall system and threat model according to an embodiment of the present invention is shown in FIG. 2. For instance, FIG. 2 illustrates a system and threat model 200 according to an embodiment of the present invention. The verifier node V 202 (on left-hand side of FIG. 2) and the prover node P 204 (on the right-hand side of FIG. 2) are remote to each other. V 202 corresponds to the entity L 102 in FIG. 1 and P 204 corresponds to the entity R 104 in FIG. 1.

In some instances, the verifier node V 202 is computing system, device, and/or entity. For instance, the verifier node V 202 can include, but is not limited to, a desktop, laptop, tablet, mobile device (e.g., smartphone device, or other mobile device), server, controller, processor, computing system and/or other types of computing entities that generally comprises one or more communication components, one or more processing components, and one or more memory components.

In some examples, the prover node P 204 is computing system, device, and/or entity. For instance, the prover node P 204 can include, but is not limited to, a desktop, laptop, tablet, mobile device (e.g., smartphone device, or other mobile device), server, controller, processor, computing system and/or other types of computing entities that generally comprises one or more communication components, one or more processing components, and one or more memory components. The prover node P 204 includes an untrusted portion 206 and a trusted portion 208 (e.g., a trusted execution environment (TEE)).

For instance, referring to FIG. 1 above, the verifier node V 202 and the prover node P 204 can be part of an IoT setting. For example, the verifier node V 02 can be a controller and/or processor. The prover node P 204 can be a robotic device such as a robotic or robot arm with one or more control systems (e.g., a controller or processor). Additionally, and/or alternatively, the verifier node V 202 and the prover node P 204 can be part of a cloud computing setting. The prover node P 204 can be a server (e.g., executed by one or more servers) and the verifier node V 202 can be a separate computing device/system/entity.

It will be appreciated that the exemplary system and threat model 200 depicted in FIG. 2 is merely an example, and that the principles discussed herein may also be applicable to other situations—for example, including other types of devices, systems, and network configurations. As used herein, V 202 can refer to the verifier node V 202 and P 204 can refer to the prover node P 204.

In operation, V 202 is trusted. P 204 is separated into two execution environments (e.g., a first/second environment that is a base for providing services by executing one or more applications): one (e.g., the first execution environment) is untrusted $P_{untrusted}$ 206 and the other one (e.g., the second execution environment) is trusted $P_{trusted}$ 208. That means, an attacker has no control over $P_{trusted}$ 208. For instance, on a node $P_{trusted}$ 208 can be the kernel space (e.g., where the kernel or the core of the operating system executes or runs) and $P_{unstrusted}$ 206 can be the user space (e.g., a memory area where the application software and/or one or more drivers execute). In settings where a node's host operating system is also not trusted, e.g., even the operating system (OS) kernel is part of $P_{untrusted}$, one can rely on special hardware support for $P_{trusted}$ 208, e.g., many CPUs platforms offer protected execution environments (e.g., TEEs). Instances are TrustZone on ARM CPUs and SGX enclaves on INTEL CPUs. Furthermore, it is assumed that the programs that run inside $P_{trusted}$ 208 are not vulnerable. To this end, keeping the programs' code base simple and small provides for meeting this assumption through thoroughly testing, reviewing, and possibly even verifying the code base. Additionally, the programs that run inside $P_{trusted}$ 208 can be statically attested prior to their execution, in particular, V 202 checks that P 204 has loaded the intended programs into memory.

In contrast to $P_{trusted}$ 208, there is assumed to be a powerful, yet realistic attacker for $P_{untrusted}$ 206. Namely, it is assumed that an attacker has control over the memory of programs that run inside $P_{untrusted}$ 206, except that an attacker cannot modify program code. For instance, an attacker can exploit input-controlled memory corruption errors in a program to read from or write to the program's memory. However, an attacker cannot overwrite code segments because the corresponding memory pages are, e.g., not writable after loading the program into memory (cf. the write-XOR-execute (WOX) policy that memory pages cannot be marked as both writeable and executable at the same time). Furthermore, there is assumed that an attacker has no control over the loading process of a program. This rules out the possibility that an attacker modifies the program prior to its execution. In the setting where P's 204 operating system is untrusted and where the program runs inside an enclave, one can statically attest the initial program state. This ensures that the enclave has been properly setup by the operating system, in particular, that the enclave runs the intended code.

Programs running inside $P_{untrusted}$ 206 and $P_{trusted}$ 208 can exchange data between each other, e.g., by having a shared memory region. Since V 202 and P 204 are separate nodes, programs running inside V 202 and P 204 communicate with each other over a network, e.g., over the Internet or a local network by using a communication protocol such as transmission control protocol (TCP) or user datagram protocol (UDP). A program of V 202 (e.g., a program executed by V 202), however, cannot directly communicate with a program of $P_{trusted}$ 208. Instead, messages to or from a program in V 202 are sent or received by programs in $P_{untrusted}$ 206, respectively, where a program in $P_{untrusted}$ 206 can act as a proxy between the programs of V 202 and $P_{trusted}$ 208. Still, the programs of V 202 and $P_{trusted}$ 208 can authenticate messages from each other. Standard cryptographic methods can be used here like message authentication codes (MACs), assuming that the programs of V 202 and $P_{trusted}$ 208 share a secret. Messages can also be sent encrypted for preventing information leakage. Again, standard cryptographic methods can be used to perform this task.

Figure 3:
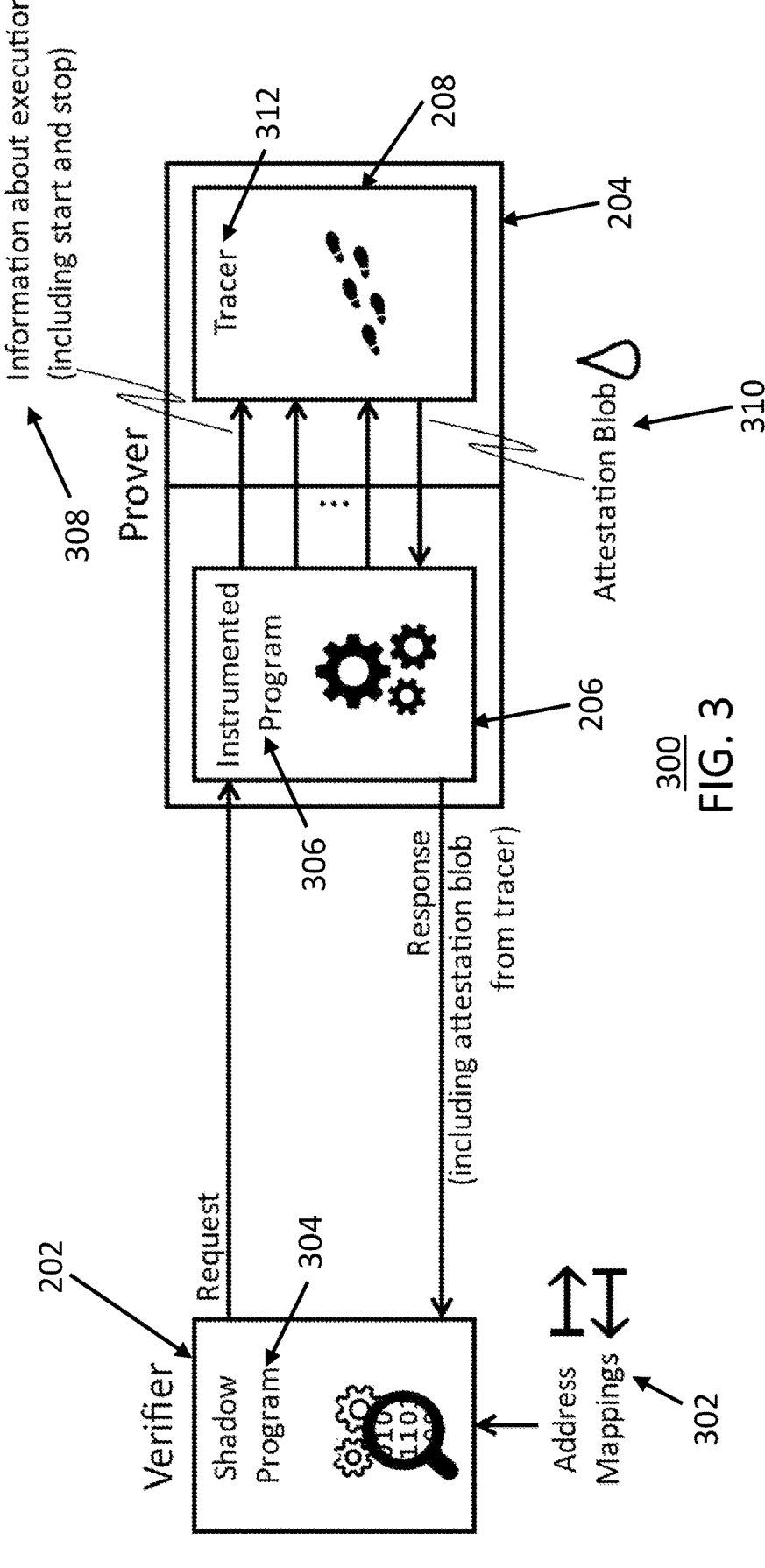
FIG. 3 illustrates the components of the system according to an embodiment of the present invention.

System Overview:

FIG. 3 illustrates the components of the system (e.g., an overview 300 of the system) according to an embodiment of the present invention. For instance, the overview 300 may be associated with the setting 100 of FIG. 1 and include the entities of FIG. 2 (e.g., V 202 and P 204, including the untrusted portion 206 and the trusted portion 208 of P 204).

For instance, V 202 sends a request to P 204, which carries out the requested operation by executing a program and sends back the result to V 202, together with additional information about the program's execution (e.g., attestation blob 310), which V 202 uses to attest the execution. It is noted that P 204 is not limited to receive requests from a single V 202. For instance, P 204 can receive requests from multiple V 202 nodes.

There is a program that serves incoming requests. In particular, the program carries out the requested operation and sends the operation's result back. Typical instances of such a program are RESTful API servers. Neither V 202 nor P 204 execute this given program, which is referred to herein as the original program. Instead, P 202 and V 204 execute variants of the original program. Namely, the original program is used to construct the instrumented program 306, which is executed by P 204, and the shadow program 304, which is executed by V.

Figure 4:
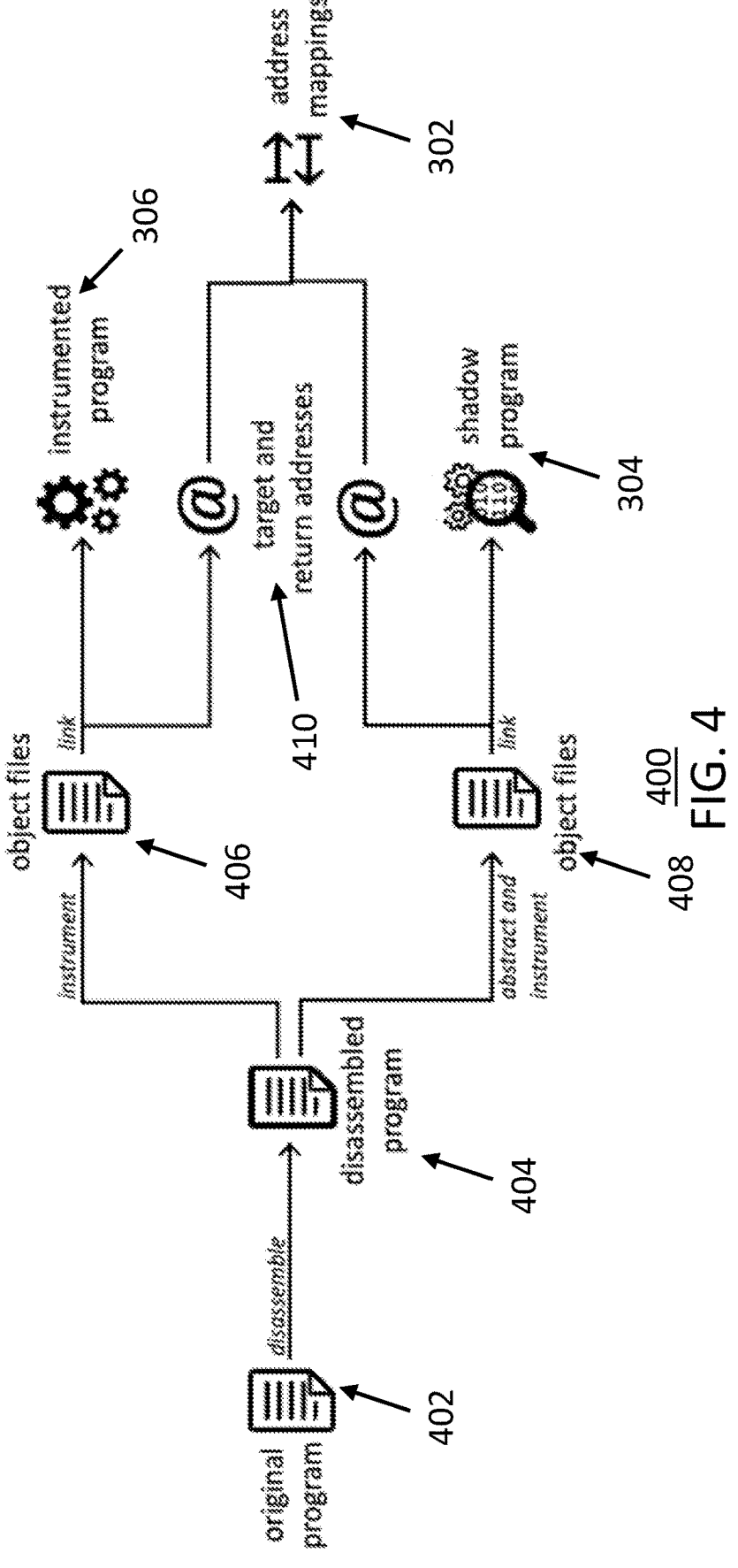
FIG. 4 illustrates the build process of an instrumented program and a shadow program according to an embodiment of the present invention.

FIG. 4 illustrates the build process of an instrumented program and a shadow program according to an embodiment of the present invention. For instance, FIG. 4 shows the process 400 of constructing the two programs—the instrumented program 306 and the shadow program 304. The operations that should be attested are known (e.g., through annotations or by an additional input). The construction process of the two program variants also outputs address mappings between program locations of the two programs. The program executed by V 202 is referred to herein as a shadow program 304 as it can be understood as some generalization of a shadow stack (see L. Szekeres, M. Payer, T. Wei, and D. Song. SoK: Eternal War in Memory. 34th IEEE Symposium on Security and Privacy (SP). IEEE, (2013), which is hereby incorporated by reference herein), which is a secondary stack for storing the return addresses of function calls to protect them from being tampered with by an attacker. A shadow program can be understood as an abstraction of the program, similar to a shadow stack that can be understood as an abstraction of the program stack.

In some examples, the construction of the instrumented program 306 and the shadow program 304 (and also the address mappings 302) is performed by an entity that offers the service provided by the original program 402, and this entity seeks to secure the service. In some examples, this entity is V 202 and in other examples, this entity is another trusted entity that is separate from V 202 and P 204. For example, this entity is trusted and often identical to or is the verifier V 202. However, the entity can outsource the attestation of executions to an attestation service, i.e., the verifier V 202. In other words, the entity (e.g., a third entity that is separate from V 202 and P 204) can perform the construction of the instrumented program 306 and the shadow program 304, and outsource the attestation of executions to an attestation service such as V 202.

In some variations, since the prover P 204 is not trusted, P 204 cannot construct the two programs. In some instances, the instrumented program 306 can be statically attested (e.g., by the verifier V 202 or by another attestation service). This static attestation is performed when P 204 loads the instrumented program into memory. It ensures that P 204 executes the expected program.

For instance, a computing entity (e.g., V 202, and/or another entity) can perform process 400. For example, the computing entity can obtain the original program 402, and disassemble the original program 402 to generate a disassembled program 404. The computing entity can perform instrumentation to generate object files 406, and can perform instrumentation and abstraction to generate object files 408. The computing entity can use the object files 406 to generate the instrumented program 306. The computing entity can use the object file 408 to generate the shadow program 304. The computing entity can further use the object files 406 and 408 to generate and/or determine the target and return addresses 410. The computing entity can use the target and return addresses to generate and/or determine the address mappings 302. V 202 and P 204 can obtain the instrumented program 306, the shadow program 304, and/or the address mappings 302. These will be described in further detail below.

However, before providing details about the instrumented program 306, the shadow program 304, and also the third system component, referred to herein as a tracer 312 shown in FIG. 3, together with details about the address mappings 302 and the attestation blob 310, the functioning of the original program 402 in the setting discussed above for serving requests is discussed. The program 402 enters after its initialization a main loop in which it waits for incoming requests. It is assumed here without loss of generality that the program 102 is non-terminating. Furthermore, for ease of illustration, it is also assumed that the program 402 handles requests sequentially.

Figure 5:
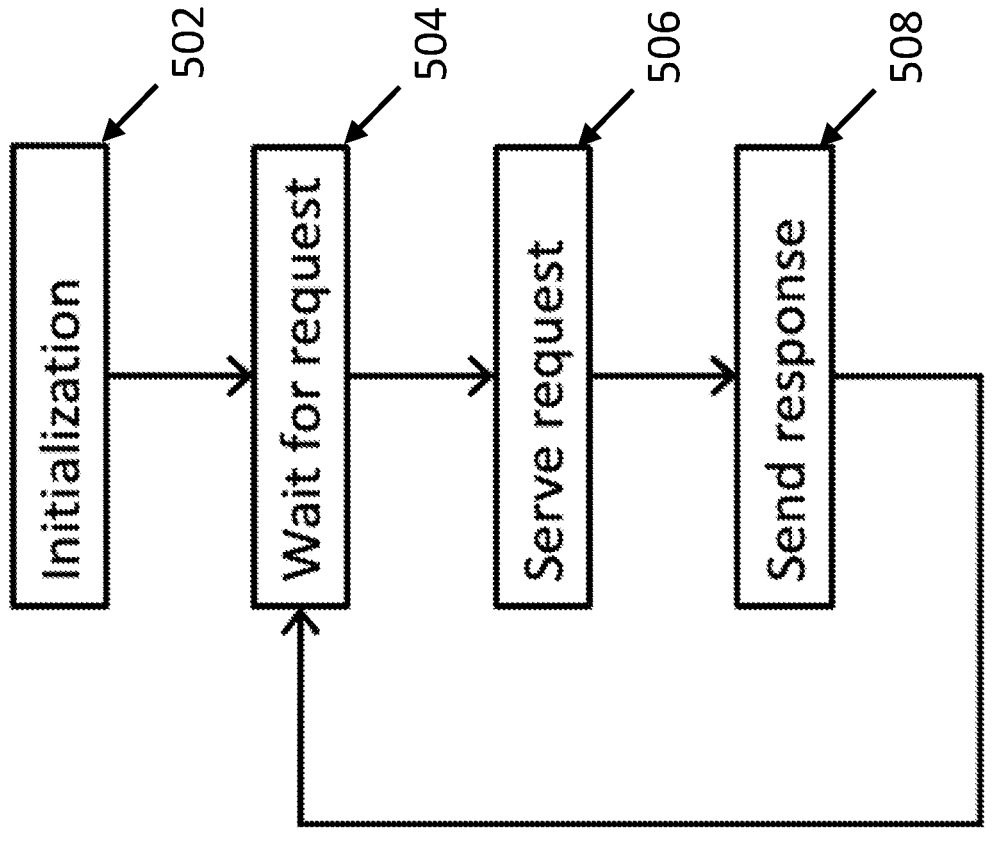
FIG. 5 illustrates the flow diagram of the original program.

The flow diagram 500 in FIG. 5 illustrates the original program's 402 operation. For instance, at step 502, the original program 402 is initialized. For instance, a thread of a computing entity (e.g., a thread of a CPU core) can initialize the original program 402. Then, at step 504, the original program 402 waits for a request. For example, by executing the program 402, the thread can wait for a request such as a request to store information into a memory location (e.g., an L3 cache). At step 506, the original program 402 serves a request. For instance, by executing the program 402, the thread can serve the request such as by storing the information into the memory location. At step 508, the original program 402 sends a response to the request. For example, by executing the program 402, the thread can provide a response such as the request has been completed, and the information has been stored into the memory location. In some examples, the request can be a representative state transfer architecture style (REST) application programming interface (API) call over hypertext transfer protocol secure (HTTPS). For instance, the original program 402 can listen on a particular port (e.g., default port is 443 for HTTPS) of the computer's internet protocol (IP address). For instance, as mentioned above in FIG. 1, the device 104 can run the original program 402, and can be an IoT device or cloud server.

Embodiments of the present invention also extend to serving multiple requests in parallel, e.g., on different CPU cores or even on different nodes. To this end, the program 402 assigns to each incoming request a unique identifier. The components described below, namely, the instrumented program 306, the tracer 312, and the shadow program 304 account for this identifier. Although requests can then be served in parallel, the handling of a request is still single threaded (e.g., multiple threads of one or more CPU cores can handle multiple requests in parallel).

Instrumented Program 306:

The instrumented program 306 runs inside $P_{untrusted}$ 206. As the original program 402, it serves the incoming requests. In particular, it performs the requested operation (from V 202) and sends the result back (to V 202). However, in addition, it attaches to the result information about the execution that handled the requested operation. This additional information is collected by the tracer 312 during runtime while serving the request and is used by the shadow program 304 later to attest the execution, as discussed below. To this end, the original program 402 is instrumented prior to its deployment. In particular, the operations of the original program 402 that serve the incoming requests are instrumented.

Figure 6:
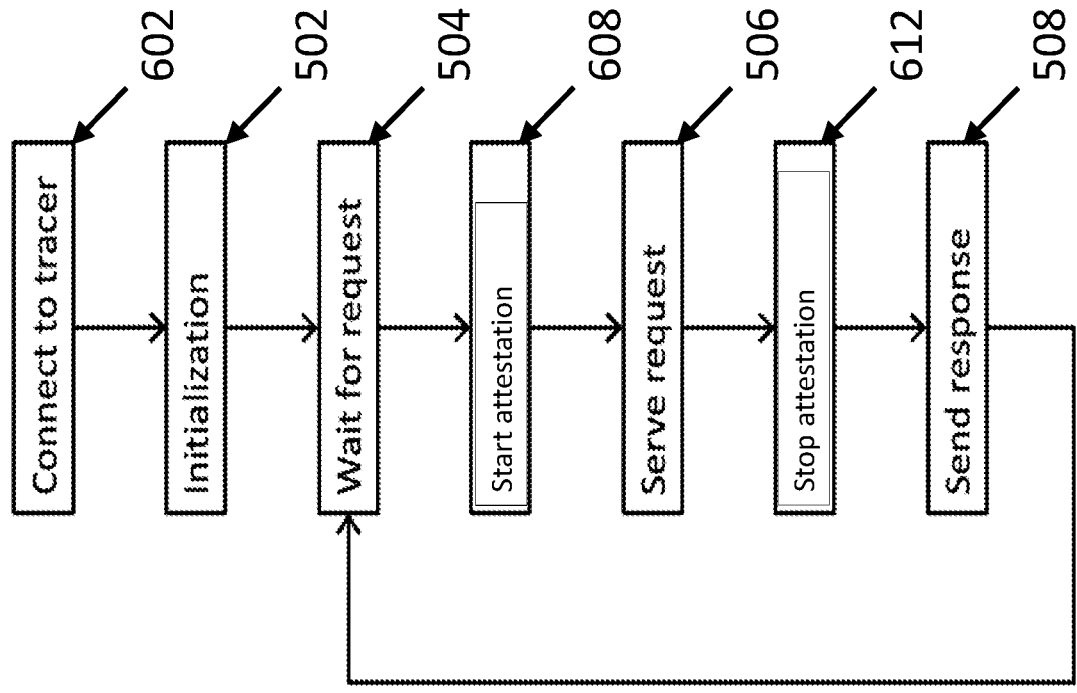
FIG. 6 illustrates the flow diagram of the instrumented program.

The instrumented program 306 follows the flow diagram 600 shown in FIG. 6. It is similar to the flow diagram 500 of the original program 402 (cf. FIG. 5). The changes are as follows. First, an additional initialization step 602 is added that establishes the connection to the tracer 312. Second, one or more attestation steps are added. For instance, before serving an incoming request, the tracer 312 is notified about the request. Analogously, the tracer 312 is notified when the operation that handles the request has been completed. When serving a request, the instrumented code is executed that invokes the tracer 312 for collecting information about the program's execution. Sending the response includes attaching the collected information to the result of the operation.

For example, the flow diagram 600 includes steps 502-508 of flow diagram 500 and further steps 602, 608, and 612. The flow diagram 600 can be executed by the $P_{untrusted}$ 206 of P 304 (e.g., the untrusted portion 206 of the computing entity P 304). At step 602, $P_{untrusted}$ 206 of P 304 performs an additional initialization step that establishes the connection to the tracer 312 (e.g., the tracer 312 that is being executed by $P_{trusted}$ 208 of P 304). At step 502, $P_{untrusted}$ 206 of P 304 performs initialization as described above. At step 504, $P_{untrusted}$ 206 of P 304 waits for a request, which is described above. At step 608, $P_{untrusted}$ 206 of P 304 starts attestation (e.g., notifies the tracer 312 about the request). At step 506, $P_{untrusted}$ 206 of P 304 serves the request as described above. In addition, at step 506, $P_{untrusted}$ 206 of P 304 invokes the tracer 312 to collect information about the program's execution (e.g., the execution when handling the request). At step 612, $P_{untrusted}$ 206 of P 304 stops attestation (e.g., notifies the tracer 312 when the operation that handles the request has been completed). At step 508, $P_{untrusted}$ 206 of P 304 sends a response as described above. In addition, $P_{untrusted}$ 206 of P 304 also attaches the collected information by the tracer 312 to the result of the operation. A computing entity (e.g., V 202 and/or another computing entity can build the instrumented program 306. Further, P 204 (e.g., $P_{untrusted}$ 206 of P 304) can execute the built instrumented program 306.

In the following, the instrumentation of the original program 402 according to an embodiment of the present invention is described. For instance, referring to step 506 of flow diagram 600, in addition to $P_{untrusted}$ 206 of P 304 serving the request, $P_{untrusted}$ 206 of P 304 also invokes the tracer 312 of $P_{trusted}$ 208 to collect information about the program's execution (e.g., perform instrumentation). For instance, the instrumentation includes adding small code snippets, referred to as trampolines, to the program code (e.g., incorporating trampolines into the code). For instance, the computing entity (e.g., V 202 and/or another computing entity) can perform the instrumentation. The instrumented program 306 can be obtained from the original program 402 by adding code snippets (e.g., trampolines). The code snippets (e.g., trampolines) delegate control to library functions that transfer information about the execution to the tracer 312 and return afterwards to the instrumented program 306, which continues with its execution. The library is linked to the instrumented program 306. The trampolines are dependent on the CPU platform. In the following, ARM CPUs are used as an example, more precisely, the ARM's 64-bit instruction set architecture (ISA) AArch64. However, the trampolines for other CPU platforms with a different instruction set such as RISC-V CPUs are similar.

There are three kinds of instructions (e.g., control-flow operations) for which the tracer 312 collects information about the execution, namely, (i) conditional branches, (ii) indirect calls and jumps, and (iii) returns. No trampolines are added to unconditional branches and direct calls such as the instructions B ("branch") and BL ("branch with link") on ARM CPUs.

Conditional branches: Intuitively speaking, the instrumented program 306 informs the tracer 312 whether the branch of a conditional branch instruction in the execution was taken or not. On ARM CPUs, the following trampoline is added to a conditional branch instruction B.cond (the original code is shown on the left-hand side and the modified code on the right-hand side):

---

Listing 1

---

```
.               .
.               .
.               .
B.cond label  B.cond taken
.             ;; condition is false
.             STP    X0, X1, [SP, #−144] !    ; extend stack and
.             STP    X2, X3, [SP, #128]        ; store scratch registers
.             STP    X4, X5, [SP, #112]        ; on the stack
              STP    X6, X7, [SP, #96]
              STP    X8, X9, [SP, #80]
              STP    X10, X11, [SP, #64]
              STP    X12, X13, [SP, #48]
              STP    X14, X15, [SP, #32]
              STP    LR, X0, [SP, #16]
              MOV    X0, #0                    ; set truth value (branch not taken)
              BL     _cfv_prv_write_cond       ; invoke tracer
              LDP    LR, X0, [SP, #16]         ; restore scratch registers
              LDP    X14, X15, [SP, #32]       ; from the stack and
              LDP    X12, X13, [SP, #48]       ; shrink stack
              LDP    X10, X11, [SP, #64]
              LDP    X8, X9, [SP, #80]
              LDP    X6, X7, [SP, #96]
              LDP    X4, X5, [SP, #112]
              LDP    X2, X3, [SP, #128]
              LDP    X0, X1, [SP], #144
              B      nottaken
              taken:
              ;; condition is true
              STP    X0, X1, [SP, #−144] !    ; extend stack and
              STP    X2, X3, [SP, #128]        ; store scratch registers
              STP    X4, X5, [SP, #112]        ; on the stack
              STP    X6, X7, [SP, #96]
              STP    X8, X9, [SP, #80]
              STP    X10, X11, [SP, #64]
              STP    X12, X13, [SP, #48]
              STP    X14, X15, [SP, #32]
              STP    LR, X0, [SP, #16]
              MOV    X0, #1                    ; set truth value (branch taken)
              BL     _cvf_prv_write_cond       ; invoke tracer
              LDP    LR, X0, [SP, #16]         ; restore scratch registers
              LDP    X14, X15, [SP, #32]       ; from the stack and
              LDP    X12, X13, [SP, #48]       ; shrink stack
              LDP    X10, X11, [SP, #64]
              LDP    X8, X9, [SP, #80]
              LDP    X6, X7, [SP, #96]
              LDP    X4, X5, [SP, #112]
              LDP    X2, X3, [SP, #128]
              LDP    X0, X1, [SP], #144
              B      label
              nottaken:
              .
              .
              .
```

---

The condition cond can be eq (for "equal"), ne (for "not equal"), and so on. If cond is al (for "always"), the branch is always taken and no instrumentation is necessary. Thus, no trampolines are added to unconditional branches.

It is assumed that the labels taken and nottaken are fresh. The trampoline calls the library function cfv_prv_write_cond, which informs the tracer 312 about the truth value of the condition cond. The condition's truth value (e.g., the number #0 or #1) is passed to the function in the X0 register. Before the call, all the scratch registers includ-ing the link register are stored on the stack and restored after the call. By convention for ARM CPUs (more precisely, in AArch64), the scratch registers X0 to X15 might not be preserved by function calls.

The instrumentation for the test-and-branch instruction (TBZ instruction) on ARM CPUs is as follows, which uses the complement test bit and branch if nonzero instruction (TBNZ) instruction and where it is assumed that the label notzero in the code snippet is fresh.

---

Listing 2

---

```
.               .
.               .
.               .
TBZ {W,X}n, #bit,   TBNZ       {W,X}n, #bit, notzero
label               ;; test is true for original program (bit is 0): save 1
.                   STP        X0, X1, [SP, #−144] !     ; extend stack and
.                   STP        X2, X3, [SP, #128]         ; store scratch registers
```

US 12,619,401 B2

15
16

-continued

Listing 2

```
 .      STP      X4, X5, [SP, #112]        ; on the stack
        STP      X6, X7, [SP, #96]
        STP      X8, X9, [SP, #80]
        STP      X10, X11, [SP, #64]
        STP      X12, X13, [SP, #48]
        STP      X14, X15, [SP, #32]
        STP      LR, X0, [SP, #16]
        MOV      X0, #1                    ; set truth value (branch taken)
        BL       _cvf_prv_write_cond       ; invoke tracer
        LDP      LR, X0, [SP, #16]         ; restore scratch registers
        LDP      X14, X15, [SP, #32]       ; from the stack and
        LDP      X12, X13, [SP, #48]       ; shrink stack
        LDP      X10, X11, [SP, #64]
        LDP      X8, X9, [SP, #80]
        LDP      X6, X7, [SP, #96]
        LDP      X4, X5, [SP, #112]
        LDP      X2, X3, [SP, #128]
        LDP      X0, X1, [SP], #144
        B        label                     ; take branch
notzero:
;; test is false for original program (bit is 1): save 0
        STP      X0, X1, [SP, #-144] !     ; extend stack and
        STP      X2, X3, [SP, #128]        ; store scratch registers
        STP      X4, X5, [SP, #112]        ; on the stack
        STP      X6, X7, [SP, #96]
        STP      X8, X9, [SP, #80]
        STP      X10, X11, [SP, #64]
        STP      X12, X13, [SP, #48]
        STP      X14, X15, [SP, #32]
        STP      LR, X0, [SP, #16]
        MOV      X0, #0                    ; set truth value (branch not taken)
        BL       _cvf_prv_write_cond       ; invoke tracer
        LDP      LR, X0, [SP, #16]         ; restore scratch registers
        LDP      X14, X15, [SP, #32]       ; from the stack and
        LDP      X12, X13, [SP, #48]       ; shrink stack
        LDP      X10, X11, [SP, #64]
        LDP      X8, X9, [SP, #80]
        LDP      X6, X7, [SP, #96]
        LDP      X4, X5, [SP, #112]
        LDP      X2, X3, [SP, #128]
        LDP      X0, X1, [SP], #144
        .
        .
        .
```

It is noted that there are other unconditional branch instructions such as BC.cond ("branch consistent conditionally") and CBZ ("compare and branch on zero"). Their trampolines are similar to the above ones and can be applied in a corresponding manner.

In other words, when detecting certain conditional branches (e.g., a conditional branch instruction B.cond), the computing entity can add trampolines to the original code. For instance, the computing entity can add instructions such as set truth value, invoke tracer 312 (e.g., by calling the library function cfv_prv_write_cond, which informs the tracer 312 about the truth value of the condition cond), restore scratch registers from the stack and shrink stack. During execution, $P_{untrusted}$ 206 of P 304 can call the library function and inform the tracer 312 about the truth value of the condition.

Indirect calls and jumps: The second kind of instructions to which trampolines are added are indirect calls and jumps. Here, a trampoline informs the tracer 312 about the target address of an indirect call or jump. On ARM CPUs, the following trampoline is added to an indirect call instruction BLR. The trampoline of an indirect jump instruction BR is similar and can be applied in a corresponding manner.

Listing 3

```
 .        .
 .        .
 .        .
BLR Xn   STP   X0, X1, [SP, #-144] !   ; extend stack and
 .        STP   X2, X3, [SP, #128]      ; store scratch registers
 .        STP   X4, X5, [SP, #112]      ; on the stack
 .        STP   X6, X7, [SP, #96]
          STP   X8, X9, [SP, #80]
          STP   X10, X11, [SP, #64]
          STP   X12, X13, [SP, #48]
          STP   X14, X15, [SP, #32]
          STP   LR, X0, [SP, #16]
```

-continued

---
Listing 3
---

```
MOV   X0, Xn               ; set function argument (omit if n=0)
BL    _cfv_prv_write_addr  ; invoke tracer
LDP   LR, X0, [SP, #16]    ; restore scratch registers
LDP   X14, X15, [SP, #32]  ; from the stack and
LDP   X12, X13, [SP, #48]  ; shrink stack
LDP   X10, X11, [SP, #64]
LDP   X8, X9, [SP, #80]
LDP   X6, X7, [SP, #96]
LDP   X4, X5, [SP, #112]
LDP   X2, X3, [SP, #128]
LDP   X0, X1, [SP], #144
BLR   Xn
.
.
.
```

The library function cfv_prv_write_addr passes the target address in the X0 register to the tracer 312. In some examples, the library function cfv_prv_write_addr can include the set function argument (e.g., the X0 register includes the target address of the indirect call/jump).

In other words, when detecting indirect calls or jumps (e.g., indirect call instruction BLR), the computing entity can add trampolines to the original code. For instance, the computing entity can add instructions, invoke the tracer 312 (e.g., by calling the library function cfv_prv_write_addr, which passes the target address in the X0 register to the tracer 312), restore scratch registers from the stack and shrink stack.

Returns: The third kind of instructions are returns. In particular, a trampoline here informs the tracer 312 about the return address of a return instruction. For instance, on ARM CPUs, the following trampoline is added to a return instruction RET, assuming that the return address is stored in the LR register.

---
Listing 4
---

```
.     .
.     .
.     .
RET   STP   X0, X1, [SP, #-144] !  ; extend stack and
.     STP   X2, X3, [SP, #128]     ; store scratch registers
.     STP   X4, X5, [SP, #112]     ; on the stack
.     STP   X6, X7, [SP, #96]
      STP   X8, X9, [SP, #80]
      STP   X10, X11, [SP, #64]
      STP   X12, X13, [SP, #48]
      STP   X14, X15, [SP, #32]
      STP   LR, X0, [SP, #16]
      MOV   X0, LR                 ; set function argument
      BL    _cfv_prv_update_hash   ; invoke tracer
      LDP   LR, X0, [SP, #16]      ; restore scratch registers
      LDP   X14, X15, [SP, #32]    ; from the stack and
      LDP   X12, X13, [SP, #48]    ; shrink stack
      LDP   X10, X11, [SP, #64]
      LDP   X8, X9, [SP, #80]
      LDP   X6, X7, [SP, #96]
      LDP   X4, X5, [SP, #112]
      LDP   X2, X3, [SP, #128]
      LDP   X0, X1, [SP], #144
      RET
      .
      .
      .
```

The trampoline for RET is similar to the BLR instruction above. However, instead of calling the library function cfv_prv_write_addr, the trampoline calls the library function cfv_prv_update_hash, which passes the return address to the tracer 312. The reason for invoking another function is that the return addresses are handled differently from target addresses of indirect calls and jumps. In some examples, the cfv_prv_update_hash can include the set function argument. In the description of the tracer 312 below, details are provided on how the tracer 312 handles the information received from the instrumented program 306 about its execution.

In other words, when detecting returns (e.g., return instruction RET), the computing entity can add trampolines to the original code. For instance, the computing entity can add instructions such as set function argument, invoke tracer 312 (e.g., by calling the library function cfv_prv_update_hash, which passes the return address to the tracer 312), restore scratch registers from the stack and shrink stack.

Optimizations: In the following, optimizations (e.g., additional and/or alternative embodiments) for the instrumentation program 306 described above are presented. In some embodiments, the computing entity can perform a first optimization. The first optimization aims at reducing the number of registers that are stored and restored before and after calling the library functions cfv_prv_write_cond, cfv_prv_write_addr, and cfv_prv_update_hash. It is only needed to store and restore the scratch registers that are used by the function. Furthermore, a register R can be removed from this set when the function: (1) never loads a value into R before the trampoline, (2) never reads from R after the trampoline, or (3) always loads a new value into R after the trampoline before reading from R. For instance, before and/or after calling the library functions, the computing entity can check whether the scratch registers are used by the library function (e.g., whether the function never loads a value into the register R, never reads from R after the trampoline, or always loads a new value into R after the trampoline before reading from R). If not, the computing entity can remove the register R from the set that needs to be stored/restored before and after calling the library functions.

By applying static analysis to the function, an over-approximation of such a set is determined. It is always safe to over-approximate this set. Alternatively, if the instrumentation already takes place during compile time, the compiler usually keeps track of which registers must be saved and loaded for a function call. This information can be used here to store and restore the necessary scratch registers for a trampoline.

In some embodiments, the above trampolines always store the link register (LR) before a call to one of the library functions and restore it afterwards. By convention, the function prologue usually already stores the LR on the stack and the function epilogue restores the LR, provided that the function is not a leave function. It is therefore often unnecessary to store and restore the LR. The trampoline for the RET instruction can also be added at the beginning of the function epilogue. In this case, the function epilogue takes care of the LR. Furthermore, if the function does not return any value, the X0 register can just be set to 0 before the RET instruction, instead of storing and restoring it.

In some embodiments, the instrumentation of conditional branches can also be optimized in certain cases. Suppose that the branch is only reachable through the branch instruction. In this case, the trampoline can be split and its second half can be added directly after the label of the branch instruction. In other words, based on the branch being only reachable through the branch instruction, the computing entity can split the trampoline into two parts. The second part is added after the label of the branch instruction.

For example, referring to the code below, as mentioned previously, the trampoline includes two parts. The first part is when the condition is false (e.g., branch not taken) and the second part is when the condition is true (e.g., branch taken). In Listing 1 above, a new label is added "taken". In contrast, here in Listing 5, no new label is added. Instead, part two (e.g., branch taken) is added to directly at the branch label. This is sound because of the assumption that the branch label is only reachable through the branch instruction.

Listing 5

```
.                  .
.                  .
.                  .
B. cond label      B. cond label
.                  ;; condition is false
.                  STP    X0, X1, [SP, #-144] !    ; extend stack and
.                  STP    X2, X3, [SP, #128]       ; store scratch registers
label:             STP    X4, X5, [SP, #112]       ; on the stack
.                  STP    X6, X7, [SP, #96]
.                  STP    X8, X9, [SP, #80]
.                  STP    X10, X11, [SP, #64]
                   STP    X12, X13, [SP, #48]
                   STP    X14, X15, [SP, #32]
                   STP    LR, X0, [SP, #16]
                   MOV    X0, #0                   ; set truth value (branch not
                   taken)
                   BL     _cfv_prv_write_cond      ; invoke tracer
                   LDP    LR, X0, [SP, #16]        ; restore scratch registers
                   LDP    X14, X15, [SP, #32]      ; from the stack and
                   LDP    X12, X13, [SP, #48]      ; shrink stack
                   LDP    X10, X11, [SP, #64]
                   LDP    X8, X9, [SP, #80]
                   LDP    X6, X7, [SP, #96]
                   LDP    X4, X5, [SP, #112]
                   LDP    X2, X3, [SP, #128]
                   LDP    X0, X1, [SP], #144
                   .
                   .
                   .
                   label :
                   ;; condition is true
                   STP    X0, X1, [SP, #-144] !    ; extend stack and
                   STP    X2, X3, [SP, #128]       ; store scratch registers
                   STP    X4, X5, [SP, #112]       ; on the stack
                   STP    X6, X7, [SP, #96]
                   STP    X8, X9, [SP, #80]
                   STP    X10, X11, [SP, #64]
                   STP    X12, X13, [SP, #48]
                   STP    X14, X15, [SP, #32]
                   STP    LR, X0, [SP, #16]
                   MOV    X0, #1                   ; set truth value (branch taken)
                   BL     _cvf_prv_write_cond      ; invoke tracer
                   LDP    LR, X0, [SP, #16]        ; restore scratch registers
                   LDP    X14, X15, [SP, #32]      ; from the stack and
                   LDP    X12, X13, [SP, #48]      ; shrink stack
                   LDP    X10, X11, [SP, #64]
                   LDP    X8, X9, [SP, #80]
                   LDP    X6, X7, [SP, #96]
                   LDP    X4, X5, [SP, #112]
                   LDP    X2, X3, [SP, #128]
                   LDP    X0, X1, [SP], #144
                   .
                   .
                   .
```

Tracer:

The tracer 312 runs inside $P_{trusted}$ 208 (e.g., $P_{trusted}$ 208 executes the tracer 312). Instead of running the tracer 312 as a normal user space process, the tracer 312 can run as a kernel module. Or, in a case where the operating system is untrusted, the tracer 312 can be separate from the host operating system. However, this requires special support from the CPU platform. For instance, on ARM CPUs, the tracer 312 can be executed inside the Secure World and on INTEL CPUs with SGX, the tracer could run inside an enclave. Analogously, on RISC-V CPUs, the tracer 312 can run inside an enclave managed by the KEYSTONE security monitor. When using trusted execution environments, the tracer 312 should be statically attested to ensure that the intended code is loaded into memory. As mentioned above, it is assumed that an attacker cannot break the protection of trusted execution environments.

The tracer 312 continuously obtains information from the instrumented program about a program's execution (see above for the instrumentation and when the instrumented program invokes the tracer 312). The tracer 312 assembles the information about an execution into an attestation blob (e.g., the attestation blob 310). The attestation blob 310 is sent to V 202, together with the execution result, where it is used by the shadow program 304 for attesting the execution (see below for the description of the shadow program 304).

An attestation blob comprises the following three data items.

(1) A list of truth values of the conditions of the conditional branches. The nth truth value in the list corresponds to the nth conditional branch instruction that is executed. As mentioned above, the tracer 312 obtains the truth values from the instrumented program via the library function cfv_prv_write_cond.

(2) A list of target addresses of the indirect calls and jumps. Analogously, the nth address in the list corresponds to the target address of the nth indirect jump call or jump that is executed. As mentioned above, the tracer 312 obtains the target addresses from the instrumented program via the library function cfv_prv_write_addr.

(3) A hash of the return addresses. The tracer maintains a hash value that is updated for each received return address. As mentioned above, the tracer 312 obtains the return addresses from the instrumented program via the library function cfv_prv_update_hash.

additionally include the number of bits of the last integer in the list (1) that correspond to truth values of conditional branches. The hash of return addresses (3) can be represented as a string. The tracer 312 can use one or more cryptographic hash functions (e.g., BLAKE3) for computing the hash.

Depending on the loader, instructions can be located at different memory addresses. In particular, memory addresses for position independent code (PIC), including the addresses of the functions in shared libraries, are not fixed. Furthermore, when the instrumented program 306 runs in a user space and the host operating system uses Address Space Layout Randomization (ASLR), the addresses that the tracer 312 obtains from the instrumented program 306 can differ between executions of the instrumented program 306. Hence, the tracer normalizes addresses.

For normalizing addresses of the instrumented program 306, the tracer 312 knows (e.g., obtains and/or determines) the offset to which the executable part of the instrumented program 306 is loaded into memory. This offset can be obtained from the operating system. Note that the offset does not leak to any other entity. Address normalization is then simply the subtraction of the offset from the obtained address. Concretely, for a return address of the instrumented program 306, the tracer 312 first subtracts the offset of the obtained address and updates then the hash with the result of the subtraction. For the target address of an indirect call or jump in the instrumented program 306, the tracer 312 stores the normalized target address in the attestation blob 310.

If the instrumented program 306 uses shared libraries, each library has a different offset. In this case, the tracer 312 obtains the offsets and the address ranges of the libraries. For an obtained address, the tracer 312 first determines the corresponding library and normalizes the address with the respective offset. The corresponding library can be determined, for example, by a binary search that compares the obtained address with the libraries' starting addresses. For return addresses, the corresponding library is included into the hash update, and for indirect calls and jumps, the respective library is added together with the normalized address to the attestation blob 310. For ease of explanation, it is assumed in the following that no shared libraries are used, and it is assumed that a single offset suffices for address normalization.

The information of an execution in an attestation blob 310 can be represented as a JAVASCRIPT Object Notation (JSON) object. An example is as follows.

---

Listing 6

---

```
{
"bits": 7,
"conds": [966239170124547450, 16997023598533784032, 23],
"addrs": [1733064073192, 1892093873254, 13187180873096, 1733064073192],
"hash": "4e388ad3fb871ddbdcee082f1928500833dd1346096bc2f9d4b0dd1889ce7895"
}
```

---

For a compact representation of an attestation blob 310, both lists (1) and (2) can be represented as sequences of unsigned integers, 32-bit or 64-bit, depending on the CPU platform. In other words, the computing entity (e.g., $P_{trusted}$ 208 when executing the tracer 312) can generate the first and second lists of the attestation blob 310 associated with the conditional branches/indirect calls and jumps as unsigned integers. Note that a single bit suffices for a truth value of a condition. To obtain the exact number of the executed conditional branch instructions, an attestation blob 310 can Referring to the above, when assuming 64-bit integers, $64+64+7=135$ conditional branch instructions were executed in the execution for the above attestation blob 310. Since the seven least-significant bits for the integer 23 in binary are 0010111, the conditions of the last two and fourth last conditional branch instructions were false, and the conditions of the third and the fifth to seventh last conditional branch instructions were true. Furthermore, the execution included four indirect calls or jumps, the first and last one with the (normalized) target address 1733064073192=0x19382ab1fe8.

An attestation blob 310 can also include meta-data such as the input of the requested operation, a timestamp and the duration for carrying out the operation, and/or a nonce. The meta-data can be used by the verifier 202 to correctly relate attestation blobs 310 to requests. Furthermore, the tracer 312 signs and possibly encrypts attestation blobs 310 before sending them to the verifier 202 for ensuring the blobs' integrity and preventing information leakage about executions. In other words, the tracer 312 can sign the attestation blob 310. Additionally, and/or alternatively, the tracer 312 can encrypt the attestation blobs 310 prior to sending them to the verifier 202.

Figure 7:
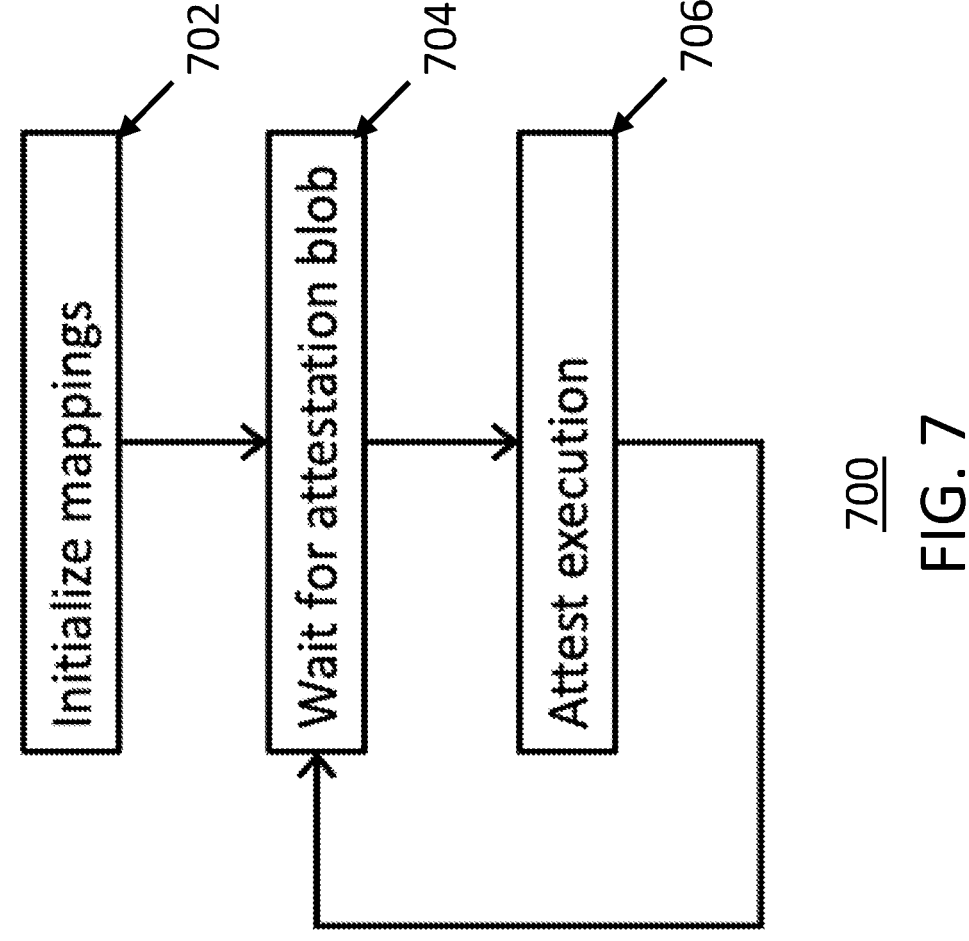
FIG. 7 illustrates the flow diagram of the shadow program.

Shadow Program 304:

A shadow program 304 runs inside V 202 (e.g., V 202 executes the shadow program 304). Its input (e.g., the shadow program's 304 input) includes information of executions of the instrumented program 306 collected by the tracer 312, in particular attestation blobs 310. Additionally, it obtains as input address mappings 302 between the instrumented program 306 and the shadow program 304, as discussed further below. The shadow program flow diagram 700 is shown in FIG. 7. For instance, at step 702, V 202, when executing the shadow program 304) initializes mappings. At step 704, V 202 waits for the attestation blob 310 from P 204. At step 706, V 202 attests execution.

The shadow program 304 is obtained from the original program 402. The shadow program 304 omits computation details that are irrelevant for attesting executions of the instrumented program 306. The shadow program 304 can be understood as an abstraction of the original program 402 with essentially the same control-flow graph, where the non-determinism that originates from the abstraction is resolved by the information included in the attestation blob 310, e.g., whether the condition of a conditional branch instruction in an execution is true or not. For instance, the shadow program 304 does not maintain a state (e.g., it does not update any local or global state variables of the original program 402). It only keeps track of the program counter of the original program 402. As a consequence, the shadow program's stack and heap are very simple. In some examples, the shadow program 304 can maintain a state (e.g., includes the monitor state). This example is described in further detail below.

Address Mappings 302:

Although the shadow program 304 and the instrumented program 306 have essentially the same control-flow graph, memory addresses of corresponding control-flow instructions from both programs are most likely not identical. Furthermore, as already discussed above, depending on the loader and also the linker, instructions can be located at different memory addresses. However, for a given target address of an indirect call or jump in an attestation blob 310, the shadow program 304 calls the corresponding abstract version of the function or jumps to the corresponding address in the shadow program. Analogously, when computing the return hash, the shadow program 304 knows for a return address of the shadow program the corresponding return address of the instrumented program. Otherwise, the hash provided by the attestation blob 310 will not match the hash computed by the shadow program 304. For correctly relating addresses of both programs, target and return addresses are normalized. Furthermore, the shadow program 304 obtains as additional input two address mappings 302.
(1) The first mapping translates (normalized) target addresses of indirect calls and jumps of the instrumented program to the corresponding (normalized) target addresses of the shadow program 304.
(2) The second mapping translates (normalized) return addresses of the shadow program 304 to the corresponding return (normalized) addresses of the instrumented program 306.

Both mappings are fixed for given programs (e.g., the instrumented program and the shadow program). They can be obtained statically from the programs in a preprocessing step. It is possible to disassemble the programs and relate addresses between the two programs. Standard programs such as objdump in Unix-like operating systems can be used for this. For instance, the target addresses for functions in direct calls can be extracted from the object files of the instrumented program 306 and the shadow program 304. In some instances, the functions in both the instrumented program 306 and the shadow program 304 have identical names. Namely, the target addresses can be obtained by a simple search in the disassembled programs for the function names (e.g., elements 802, 804, and 808 in FIG. 8). It is remarked that a refined static analysis can reveal which functions can be indirectly called. Furthermore, since the control-flow graphs of both programs 304 and 306 match, a computing entity can find the matching return addresses of function calls, e.g., the matching of addresses after a BL or BLR instructions in both programs (e.g., elements 806 and 810 in FIG. 8). In some variations, FIG. 8 shows a part of the disassembled programs by using the objdump tool.

Figure 8:
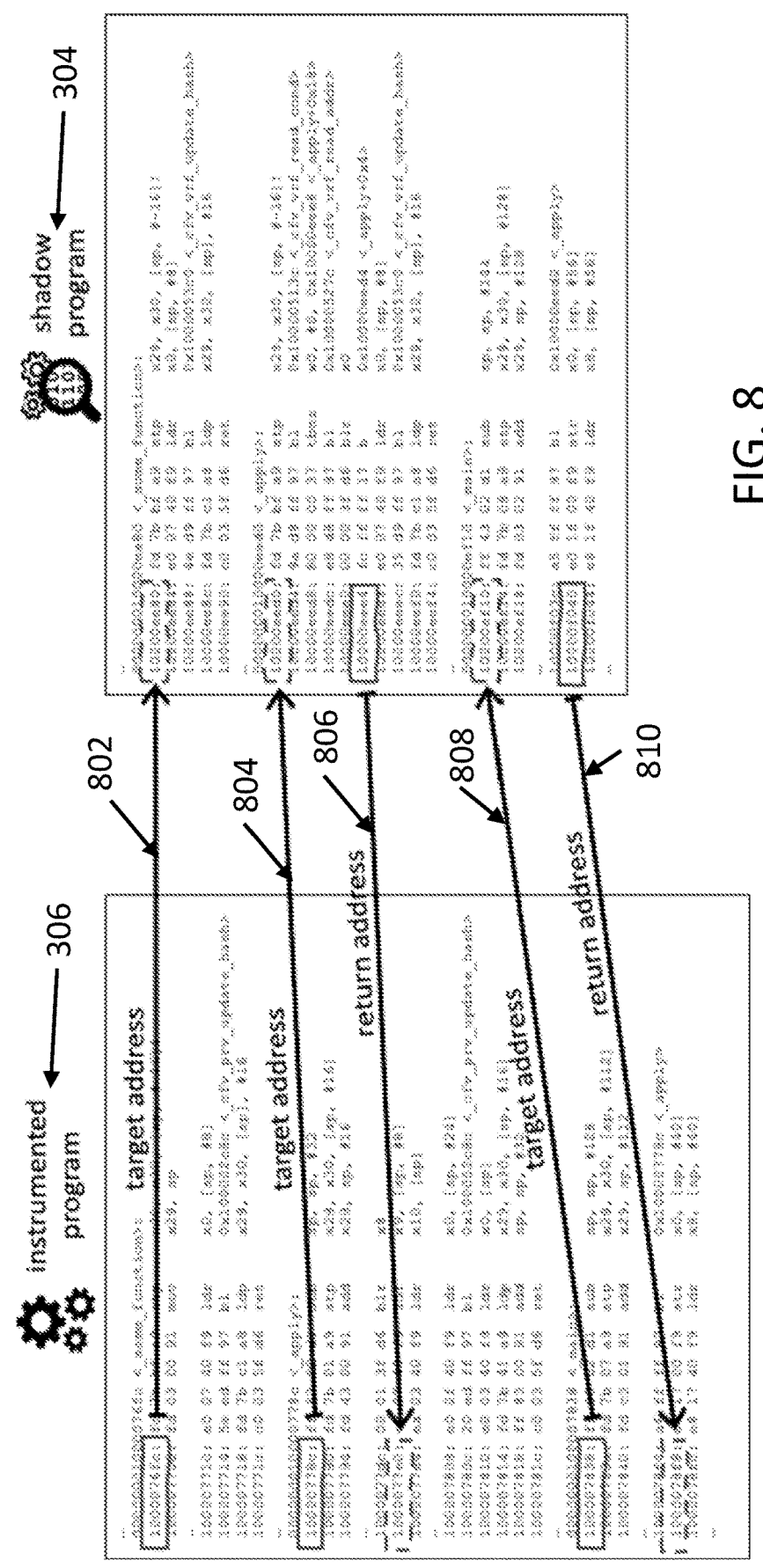
FIG. 8 illustrates the target and return address mappings between the instrumented program and the shadow program according to an embodiment of the present invention.

For instance, FIG. 8 illustrates the target and return address mappings between the instrumented program 306 and the shadow program 304 according to an embodiment of the present invention. For example, FIG. 8 shows the dumps of both programs and the mappings (1) and (2) between the (normalized) target and return addresses. For instance, the mappings for the instrumented program 306 and the shadow program 304 include mappings 802-810.

A JSON object can be used again to represent these two mappings (1) and (2). For instance, a computing entity (e.g., V 202) can generate the mappings as a JSON object. An example with addresses as string in hexadecimal is as follows, where the mapping (1) is named "targets" and the mapping (2) is named "returns".

Listing 7

```
{
    "targets": {
        "0x1000076fc":"0x10000ee80",
        "0x100007720":"0x10000ee94",
        "0x100007744":"0x10000eea8",
        "0x100007768":"0x10000eebc",
        ...
    },
    "returns": {
        "0x10000eee4":"0x1000077e0",
        "0x10000f040":"0x1000078f8",
        ...
    }
}
```

For example, the (normalized) target address 0x1000076fc for an indirect call, or a jump can be the start address of a function in the instrumented program 306; the corresponding function in the shadow program 304 would start at the (normalized) address 0x1000ee80. The mapping 802 can reflect this mapping. The (normalized) return address of a function call 0x1000eee4 in the shadow program 304 corresponds to the (normalized) return address 0x1000077e0 in the instrumented program 306. The mapping 806 reflects this mapping. The dots are placeholders for more key-value pairs in the respective mapping.

Internally, the shadow program 304 can use two hashmaps with unsigned integer key-value pairs to efficiently translate addresses during its runtime, in particular when attesting the executions of the instrumented program 306 of the requested operations by processing the attestation blobs 310. For a target address from the attestation blob 310, the shadow program 304 first makes a lookup in the hashmap for the mapping (1). The resulting value is the corresponding (normalized) target address of the shadow program 304. It then adds the offset to obtain the actual target address in memory. For a return address, the shadow program 304 first normalizes the address and translates it then via mapping (2) into a (normalized) target address of the instrumented program 306. The shadow program 304 finally updates the hash with the resulting return addresses.

In other words, at step 706, when executing the shadow program 304, V 202 can use two hashmaps with unsigned integer key-value pairs to efficiently translate addresses during its runtime. For instance, when the attestation blobs 310 indicate a target address (e.g., when V 202 detects a target address within the attestation blobs 310), V 202 can make a lookup in the hashmap to determine a corresponding normalized target address of the shadow program 304. V 202 can then use an offset along with the normalized target address (e.g., add the offset with the normalized target address) to determine the actual target address in memory. When the attestation blobs 310 indicate a return address (e.g., when V 202 detects a target address within the attestation blobs 310), V 202 normalizes the address and translates it via mapping (e.g., based on using the hashmap) into a normalized target address. V 202 then updates the hash from the hashmap with the resulting return addresses.

An optimization (e.g., one or more additional or alternative embodiments) is to initialize the hashmaps with actual addresses of the shadow program 304. Concretely, then initializing the hashmap for the mapping (1), it is possible to directly add the shadow program's 304 offset to the values, in particular the (normalized) target addresses of the shadow program 304. Analogously, when initializing the hashmap for the mapping (2), it is possible to directly add the offset to the keys, in particular the return addresses of the shadow program 304.

Instrumentation:

In the following, the modifications to the original program 402 for attesting an execution of the instrumented program 306 by processing an attestation blob 310 are described. Analogously to the instrumented program, the shadow program has modified: (i) conditional branches, (ii) indirect calls and jumps, and (iii) returns. Here, the counterparts of the library functions cfv_prv_write_cond, cfv_prv_write_addr, and cfv_prv_update_hash, namely, the functions cfv_vrf_read_cond, cfv_vrf_read_addr, and cfv_vrf_update_hash are used. As for the instrumented program 306, details are provided for the ARM CPUs instruction set. Furthermore, as in the instrumented program 306, unconditional branches and direct calls are not modified.

Conditional branches: A conditional branch instruction B.cond of the original program is modified as follows in the shadow program.

---

Listing 8

```
       .        .
       .        .
       .        .
B.cond label  STP   X0, X1, [SP, #−144] !  ; extend stack and
       .      STP   X2, X3, [SP, #128]     ; store scratch registers
       .      STP   X4, X5, [SP, #112]     ; on the stack
       .      STP   X6, X7, [SP, #96]
              STP   X8, X9, [SP, #80]
              STP   X10, X11, [SP, #64]
              STP   X12, X13, [SP, #48]
              STP   X14, X15, [SP, #32]
              STP   LR, X0, [SP, #16]
              BL    _cfv_vrf_read_cond     ; read next truth value into
              TBNZ  X0, #0, nottaken       ; test condition
              ;; condition was true in execution according to attestation blob
              LDP   LR, X-, [SP, #16]      ; restore scratch registers
              LDP   X14, X15, [SP, #32]    ; from the stack and
              LDP   X12, X13, [SP, #48]    ; shrink stack
              LDP   X10, X11, [SP, #64]
              LDP   X8, X9, [SP, #80]
              LDP   X6, X7, [SP, #96]
              LDP   X4, X5, [SP, #112]
              LDP   X2, X3, [SP, #128]
              LDP   X0, X1, [SP], #144
              B     label                  ; jump to label
       nottaken:
              ;; condition was false in execution according to attestation blob
              LDP   LR, X0, [SP, #16]      ; restore scratch registers
              LDP   X14, X15, [SP, #32]    ; from the stack and
              LDP   X12, X13, [SP, #48]    ; shrink stack
              LDP   X10, X11, [SP, #64]
              LDP   X8, X9, [SP, #80]
              LDP   X6, X7, [SP, #96]
```

-continued

| Listing 8 |
|---|
| LDP     X4, X5, [SP, #112] |
| LDP     X2, X3, [SP, #128] |
| LDP     X0, X1, [SP], #144 |
| . |
| . |
| . |

The shadow program 304 obtains the truth value of the condition cond from the currently processed attestation blob 310 by calling the function cfv_vrf_read_cond. The truth value is returned in the X0 register. The added test-and-branch instruction TNZB, which replaces the original B.cond instruction, selects the branch accordingly to the truth value. The function cfv_vrf_read_cond panics if no truth value is available in the attestation blob 310 and attestation fails.

The other conditional branch instructions are modified similarly. Furthermore, as for the instrumented program 306, conditional branches are not altered. In particular, it is assumed above that the cond above is different from al.

In other words, for certain conditional branch instructions within the original program 402 (e.g., a conditional branch instruction B.cond), the computing entity can update/modify the original code. For instance, in the shadow program 304, the computing entity can add instructions such as calling functions (e.g., the function cfv_vrf_read_cond) that obtains the truth value of the condition from the attestation blob 310, test the condition, restore scratch registers from the stack and shrink stack. In operation, when executing the shadow program 304 and based on detecting certain conditional branches, V 202 can execute the function cfv_vrf_read_cond to obtain the truth value of the condition from the attestation blob 310 and test the condition (e.g., perform test-and-branch instruction TNZB based on the obtained condition from the attestation blob 310), and determine a result of the test (e.g., pass or fail). V 202 can also restore the scratch registers from the stack and shrink stack.

Indirect calls and jumps: A BLR instruction is modified as follows. The modification for a BR instruction is similar and can be applied in a corresponding manner.

| Listing 9 | | | |
|---|---|---|---|
| . | . | | |
| . | . | | |
| . | . | | |
| BLR Xn | STP | X0, X1, [SP, #–144] ! | ; extend stack and |
| . | STP | X2, X3, [SP, #128] | ; store scratch registers |
| . | STP | X4, X5, [SP, #112] | ; on the stack |
| . | STP | X6, X7, [SP, #96] | |
| | STP | X8, X9, [SP, #80] | |
| | STP | X10, X11, [SP, #64] | |
| | STP | X12, X13, [SP, #48] | |
| | STP | X14, X15, [SP, #32] | |
| | STP | LR, X0, [SP, #16] | |
| | BL register | _cfv_vrf_read_addr | ; read next target address X0 |
| | MOV | Xn, X0 | ; load target address into Xn register |
| | LDP | LR, X0, [SP, #16] | ; restore scratch registers |
| | LDP | X14, X15, [SP, #32] | ; from the stack and |
| | LDP | X12, X13, [SP, #48] | ; shrink stack |
| | LDP | X10, X11, [SP, #64] | |
| | LDP | X8, X9, [SP, #80] | |
| | LDP | X6, X7, [SP, #96] | |
| | LDP | X4, X5, [SP, #112] | |
| | LDP | X2, X3, [SP, #128] | |
| | LDP | X0, X1, [SP], #144 | |
| | BLR | Xn | ; indirect call |
| . | | | |
| . | | | |
| . | | | |

The library function cfv_vrf_read_addr reads the next (normalized) target address from the currently processed attestation blob 310. Furthermore, the function translates the address into the corresponding target address of the shadow program 304. The function returns the translated address in the X0 register. As for conditional branches, the function cfv_vrf_read_addr panics if no target address is available in the attestation blob 310.

In other words, for indirect calls or jumps instructions (e.g., indirect call instruction BLR), the computing entity can update/modify the original code. For instance, in the shadow program 304, the computing entity can add instructions such as calling functions (e.g., the function cfv_vrf_read_addr) that reads the next (normalized) target address from the currently processed attestation blob 310, translates the address into the corresponding target address of the shadow program 304, and returns the translated address in the X0 register. The computing entity can add further instructions for restoring scratch registers from the stack and shrink stack. In operation, when executing the shadow program 304, V 202 can execute the function cfv_vrf_read_addr to read the next target address from the attestation blob, translate the address into a corresponding target address of the shadow program, return the translated address in the X0 register, and/or restore the scratch registers from the stack and shrink stack.

Returns: A return instruction RET is modified as follows, where it is assumed that the return address is stored in the link register.

---

Listing 10

```
.        .
.        .
.        .
RET    STP    X0, X1, [SP, #-144] !    ; extend stack and
.      STP    X2, X3, [SP, #128]       ; store scratch registers
.      STP    X4, X5, [SP, #112]       ; on the stack
.      STP    X6, X7, [SP, #96]
       STP    X8, X9, [SP, #80]
       STP    X10, X11, [SP, #64]
       STP    X12, X13, [SP, #48]
       STP    X14, X15, [SP, #32]
       STP    LR, X0, [SP, #16]
       MOV    X0, LR                   ; load return address into
       BL     _cfv_vrf_update_hash     ; normalize address and update
       LDP    LR, X0, [SP, #16]        ; restore scratch registers
       LDP    X14, X15, [SP, #32]      ; from the stack and
       LDP    X12, X13, [SP, #48]      ; shrink stack
       LDP    X10, X11, [SP, #64]
       LDP    X8, X9, [SP, #80]
       LDP    X6, X7, [SP, #96]
       LDP    X4, X5, [SP, #112]
       LDP    X2, X3, [SP, #128]
       LDP    X0, X1, [SP], #144
       RET                             ; return
.
.
.
```

---

In contrast to the above modifications, no values are read from the attestation blob 310. The library function cfv_vrf_update_hash translates the (normalized) return address of the shadow program 304 into the corresponding (normalized) return address of the instrumented program 306. Furthermore, it updates the hash value with the translated address. At the end of the attestation process, the hash value is compared with the hash value from the attestation blob 310. If they do not match, attestation fails. Attestation also fails if the execution of the shadow program did not consume all the truth values for conditional branches and target addresses from the attestation blob.

In other words, for return instructions (e.g., return instruction RET), the computing entity can update/modify the original code. For instance, in the shadow program 304, the computing entity can add instructions such as calling functions (e.g., the function cfv_vrf_update_hash) that translates the (normalized) return address of the shadow program 304 into the corresponding (normalized) return address of the instrumented program 306, updates the hash value with the translated address, and compare the hash value with the hash value from the attestation blob 310. The computing entity can add further instructions for restoring scratch registers from the stack and shrink stack. In operation, when executing the shadow program 304, V 202 can execute the function cfv_vrf_update_hash, restore the scratch registers from the stack and shrink stack.

After performing the shadow program flow diagram 700, the computing entity (e.g., V 202 or another computing entity) can check an output of the shadow program. Further, based on the output, the computing entity can flag data from the respective service or device as potentially corrupted. Additionally, and/or alternatively, the computing entity can provide one or more instructions that resets and/or quarantines the device/service (e.g., the prover 204 and/or the instrumented program 306). For instance, based on the output (e.g., results for executing the first through third call instructions above associated with the conditional branch, indirect calls/jumps, and/or return instructions), the computing entity (e.g., V 202) can provide one or more instructions such as resetting a remote robotic device (e.g., P 204).

Optimizations: Analogously to the optimization of the trampolines of the instrumented program, the added code in the shadow program can be optimized.

Code Removal:

In addition to the described modifications for conditional branches, indirect calls and jumps, and returns, an embodiment of the present invention provides to remove code that is irrelevant for attesting the control flow in executions. For instance, V 202 can remove code that is irrelevant for attesting the control flow in executions. First, it is noted that the shadow program 304 does not maintain any state about an execution, except the program counter. Thus, code related to the original's program state (data) is removed from the shadow program 304 (e.g., V 202 can remove code related to the original's program state). Furthermore, for attesting an execution, the shadow program 304 does not allocate memory on the heap. The stack is only used to store return addresses of function calls and the content of the X0 register for the calls to the library functions cfv_vrf_read_cond, cfv_vrf_read_addr, and cfv_vrf_udate_hash (cf. the code snippets above). In the case where the modified function does not use the X0 register, saving the content of the X0 register on the stack before calling one of these library functions and restoring it afterwards is actually not necessary. Conditional branches and direct calls are kept unmodified in the shadow program 304.

The fact of not maintaining a state (e.g., no global and local variables) enables to further optimize the added code, compared to the optimizations as discussed for the instrumented program 306. In particular, the scratch registers X0 to X15 are not used for data values. Hence, there is no need to store and restore them. No static analysis is needed. Since neither the scratch registers nor the link register must be stored and restored, it is possible to replace a conditional branch such as B.cond as follows.

---

Listing 11

```
.            .
.            .
.            .
B.cond label   BL      _cfv_vrf_read_cond   ; read next truth value into X0
.              register
.              TBNZ    X0, #0, label        ; test condition
.              .
.              .
.              .
```

For an indirect call BLR, the X0 registers can be used for the target address.

---

Listing 12

```
    .        .
    .        .
    .        .
BLR   Xn   BL     _cfv_vrf_read_cond   ; read target address into X0 register
    .        BLR   X0
    .        .
    .        .
             .
```

---

In other words, the computing entity (e.g., V 202) can perform code removal to replace the conditional branch with the above code and/or modify the indirect call as shown above in listing 12.

Example

Figure 9:
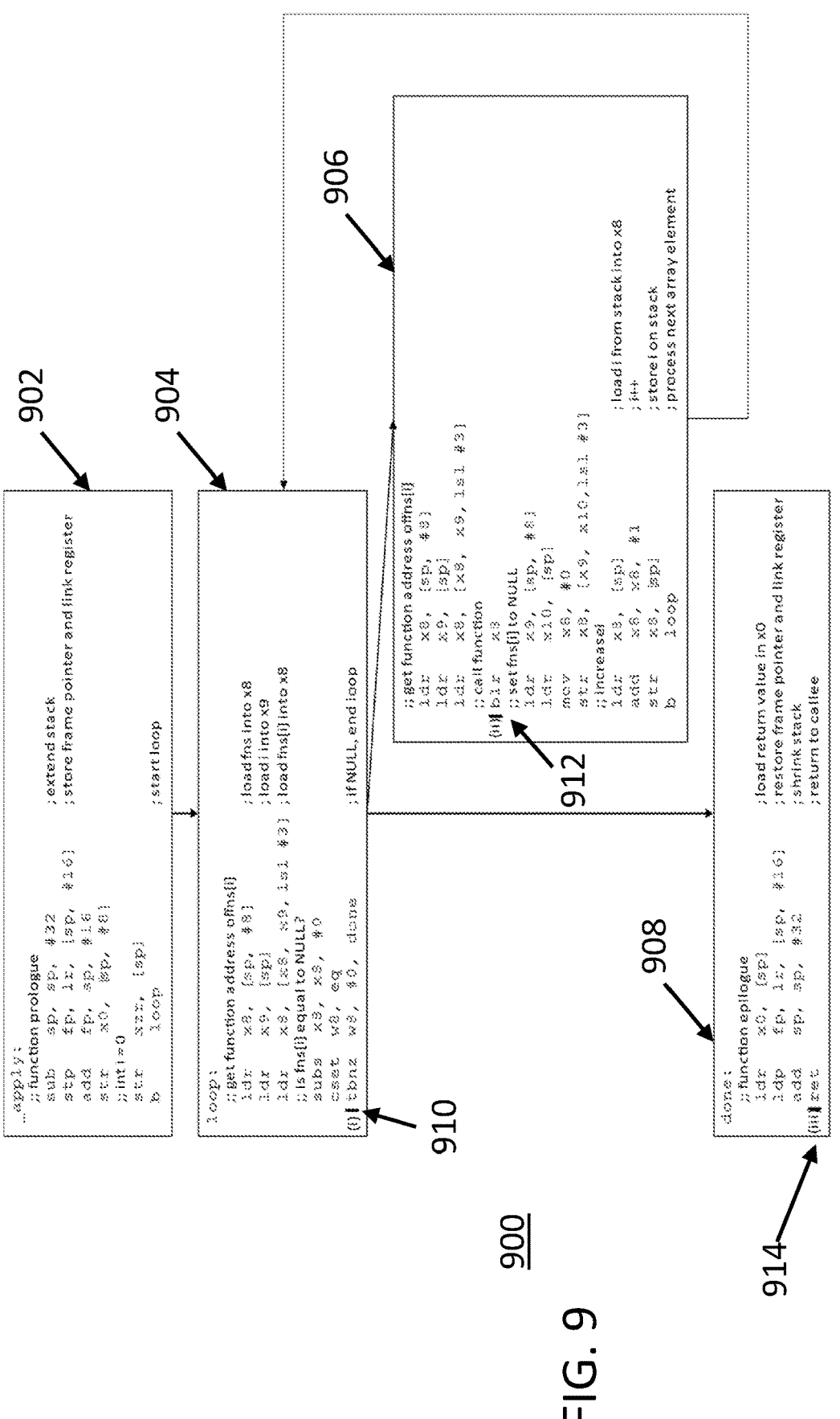
FIG. 9 illustrates the control-flow graph (with its basic blocks) of the function apply of the original program.

To illustrate the instrumentation for the instrumented program 306 and the shadow program 304, consider the function shown in FIG. 8 from an original program 402. FIG. 9 shows, in addition to the function's assembly code, the control-flow graph (CFG) 900 of the function with its basic blocks (BBs) 902-908. The assembly code is annotated in FIG. 8 with comments. The vertical bars 910-914 in FIG. 8 mark the: (i) conditional branches, (ii) indirect calls, and (iii) returns.

The assembly code originates from the following C code:

---

Listing 13

```
typedef void (*fn) ( );
int64_t apply(fn *fns) {
    int64_t i = 0;
    while (fns[i] != NULL) {
        (fns[i]) ( );
        fns[i] = NULL;
        i++;
    }
    return i;
}
```

---

The function apply iterates through an array of function pointers until visiting a NULL pointer. The function apply calls the functions in the order in which it visits their pointers. After calling a function, the function apply sets the respective array element to NULL. Finally, the function apply returns the number of called functions.

Figure 10:
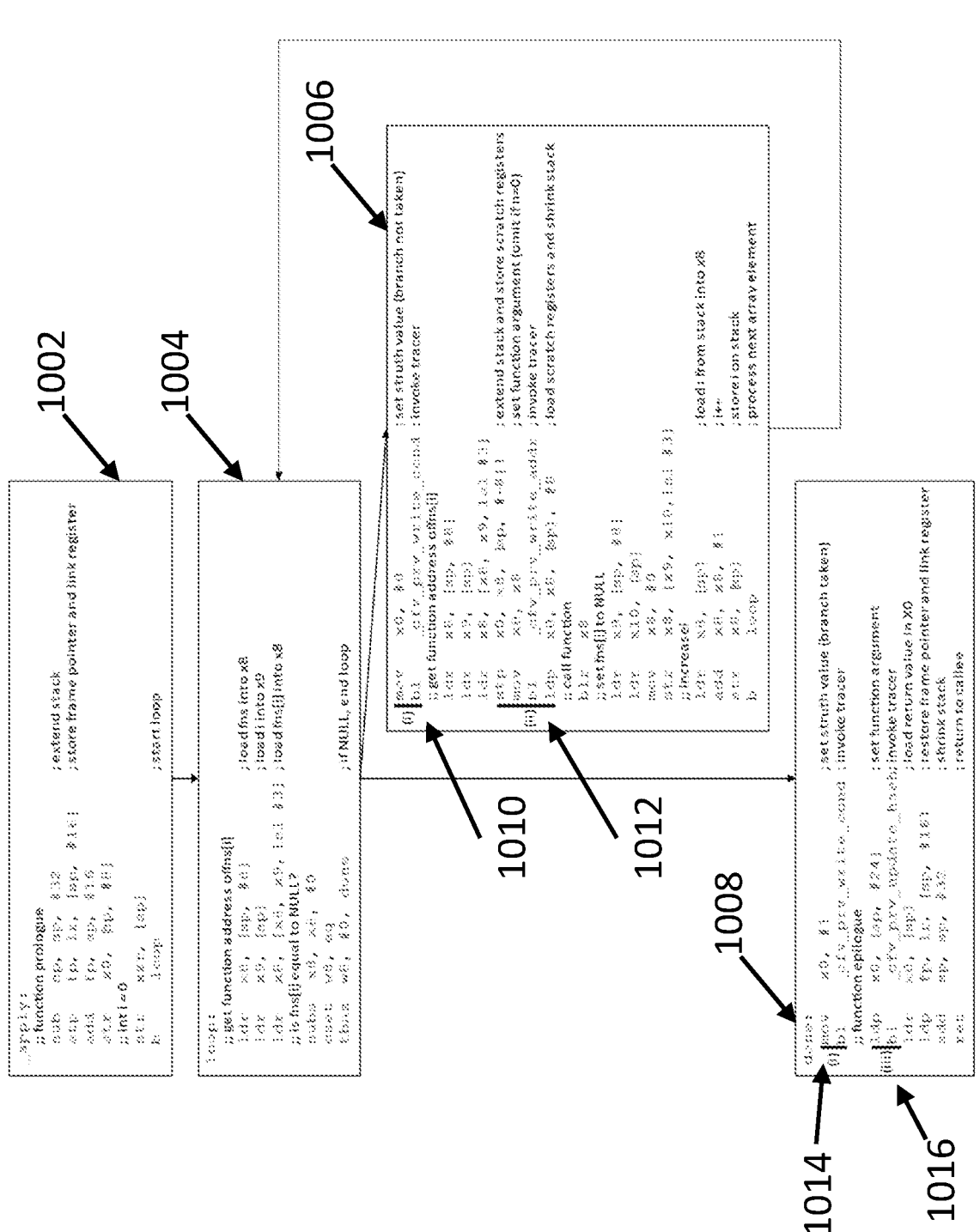
FIG. 10 illustrates the apply function of the instrumented program.

FIG. 10 shows the function apply of the instrumented program 306. Again, the function's control-flow graph 1000 with its basic blocks 1002-1008 is shown. The instrumentation adds three trampolines to the function apply, where one or more of the discussed optimizations are used. The first trampoline (i) takes care of the conditional branch, which stems from the while loop. This trampoline is split across two locations. The second trampoline (ii) takes care of the indirect call. Finally, the third trampoline (iii) takes care of the return address. The trampolines are marked with vertical bars 1010-1016.

Figure 11:
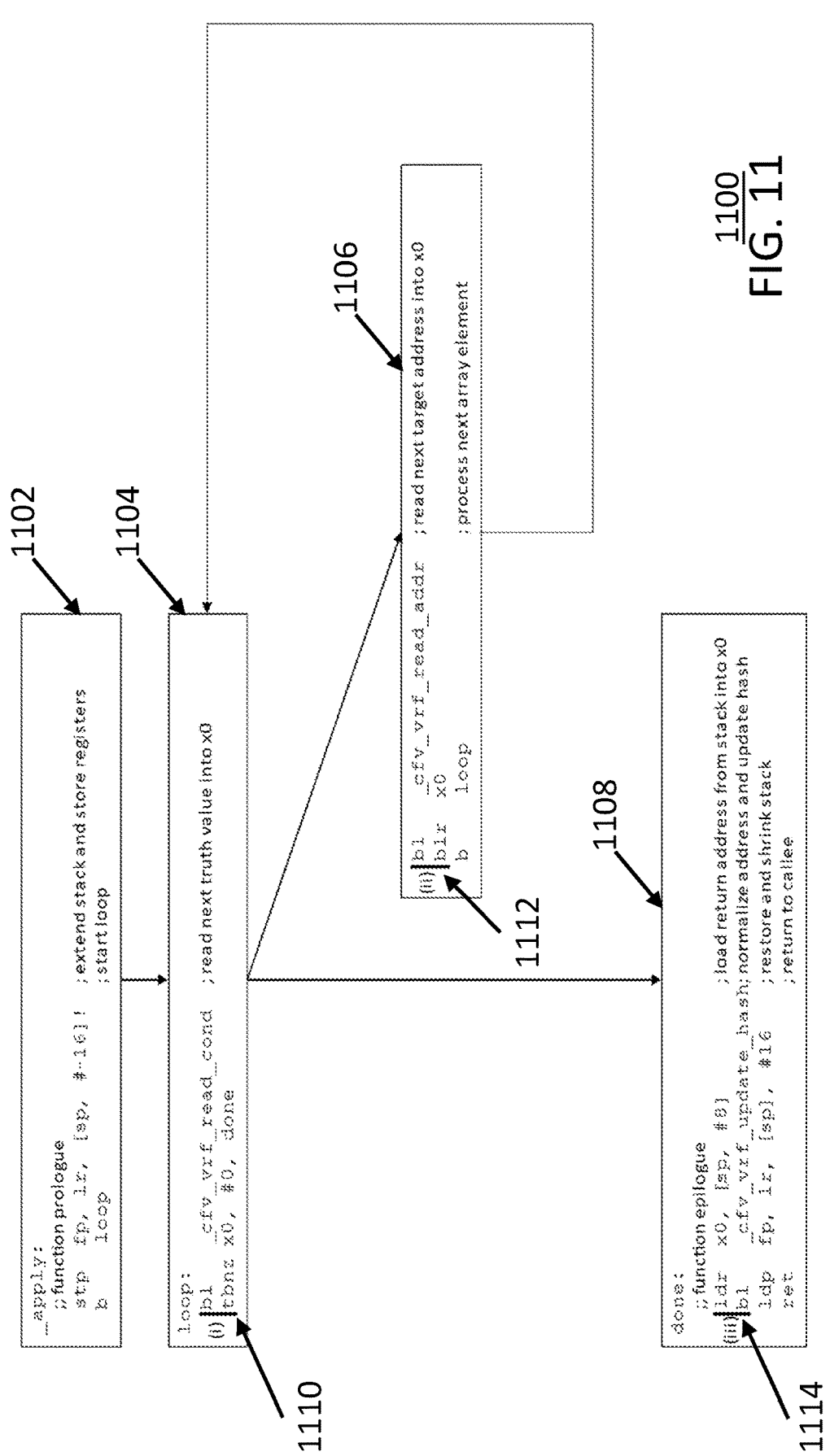
FIG. 11 illustrates the control-flow graph with its basic blocks of the abstracted apply function from the shadow program.

FIG. 11 shows the control-flow graph 1100 with its basic blocks 1102-1108 of the abstracted function apply from the shadow program. Analogously to FIG. 9, the code related to the information from the attestation blob 310 is marked with vertical bars 1110-1114. The apply function from the shadow program 304 does not take any arguments and it does not return any value. After the function's prologue, which stores the link register on the stack, the function reads the truth value from a given attestation blob 310 for the loop condition. If the loop condition is satisfied, it reads the target address from the attestation blob 310 and calls the corresponding abstract function in the shadow program. Finally, it jumps back to the loop condition. In the function's epilogue, the function updates the return hash before restoring the link register. Since the shadow program 304 does not maintain any state, there is no code that sets the array elements to NULL. There is also no code that increments the local counter of the original function apply.

Embodiments of the present invention provide for efficient computation and reduced overhead in terms of compute power and computational resources for attesting executions. Although there is some overhead on the prover 204 and on the verifier 202 by executing the instrumented program 306 and the shadow program 304, respectively, as the above example already illustrates, the overhead on both sites remains often relatively small. In contrast, the overhead of OAT for the instrumented program, despite being reported as small and manageable, is significantly more than in embodiments of the present invention, which provide to optimize the instrumentation, resulting in a further reduction of the overhead for executing the instrumented program 306.

As the above example also illustrates, the shadow program 304 is usually significantly smaller than the original program 402 and its execution for a given attestation blob 310 is fast. Notably, the shadow program 304 has hardly any IO, limited memory access, and address mappings are easy and simple (e.g., lookups in hashmaps take constant time). In contrast, the verification method of OAT requires that target and return addresses are known prior to the execution of the instrumented program and fixed during different executions. In particular, the described verification method is not compatible with position-independent code (PIC) and address space layout randomization (ASLR), which are standard on most operating systems today, for the instrumented program 306. Furthermore, since the shadow program 304 is a native executable, the overhead for the verifier 202 for attesting executions is significantly reduced, compared to following the execution paths in the disassembled instrumented program 306.

Monitor:

In the following, an extension for attesting executions (e.g., step 706 of FIG. 7) according to an embodiment of the present invention is described. The extension provides enhanced computer functionality to be able to check whether a given property holds for an execution. This can be a basic non-reachability property indicating that a program location is never visited during an execution. More complex properties can also be checked.

Figure 12:
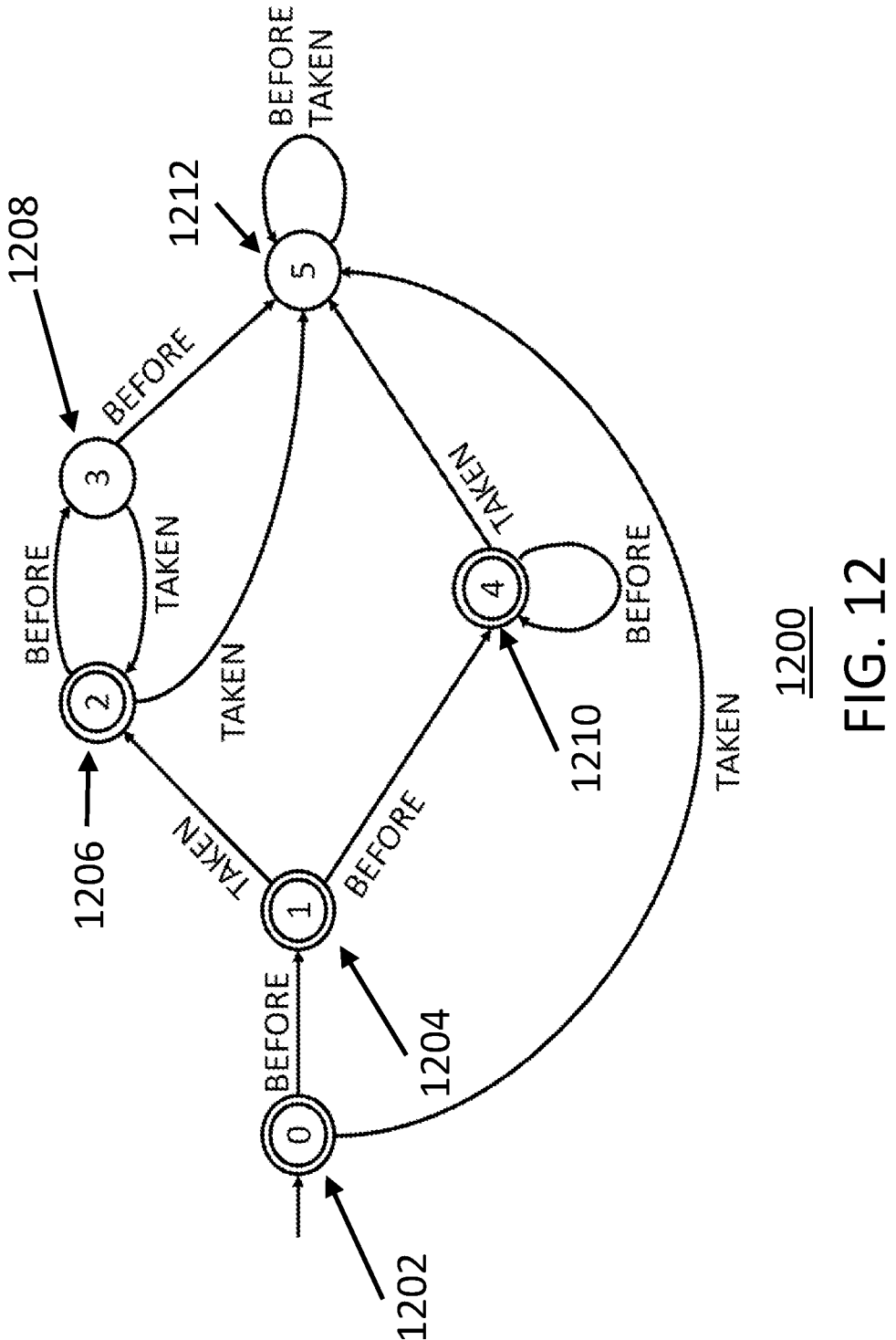
FIG. 12 illustrates the first example of the monitor's underlying finite-state machine.

For the additional verification of properties of an execution of the (instrumented) program, the shadow program 304 is extended with a state. The state comprises two parts. First, the shadow program 304 maintains an abstract state. Second, the shadow program maintains 304 a monitor state. The instrumented program 306 is also extended. This extension records state information about a program's execution and stores it in an (extended) attestation blob 310. In the following, details about these extensions are provided. Regarding the monitoring state and the abstract state, when the property is given as a state machine (as shown in FIG. 12), the monitor state includes the current state of the state machine. In contrast, the abstract state can be understood as an abstraction of the state of the original program 402. For instance, the abstract state can comprise a global Boolean state variable of the original program 402. This is described below.

State Information:

It is assumed that the original program 402 is given as source code in some higher-level programming language such as C. The source code is compiled to machine code. When only having access to the program's machine code, it is less obvious how to specify properties on the program's data. For instance, data values are usually either stored on the stack or heap at some memory address, but they are often also stored provisionally in registers during computations. The used registers depend on the compiler with its optimizations. The memory addresses depend on the compiler, the linker, and can even depend on the OS loader, in particular, for PIC.

A concrete state of the original program 402 is an assignment of the global and local program variables to values. For instance, the original program 402 can have a global 64-bit integer program variable n. A state assigns a 64-bit integer value to n. A state also comprises the program location, which is implicitly given.

Let pred be a predicate over the program variables of the original program 402. Examples of predicates are whether a program variable n, e.g., the counter of a for-loop, is positive, exceeds some fixed threshold, or is equal to some other program variable m. Corresponding C macros for these predicates are as follows, where, for the sake of generality, macro parameters are used that can be instantiated with program variables.

explanation and without loss of generality, the following example uses Booleans for abstract states.

Sample Points and Check Points:

In one or more embodiments of the present invention, sample points are added to the original program 402 and corresponding check points are added to the shadow program 304. For instance, the computing entity can add check points to the shadow program 304 and/or original program 402. The sample points are annotated in the source code of the original program 402. These annotations include the predicates, which can be different for the different sample points. The annotations also include identifiers for the sample points. These annotations carry over to the instrumented program 306. The shadow program 304 includes the corresponding annotations for the matching check points. At a sample point, the instrumented program 306 writes state information to the attestation blob 310. In particular, during an execution, the instrumented program 306 evaluates the predicates of the sample point and forwards the truth values to the tracer 312, which writes the vector of Boolean values to the attestation blob 310. At a check point, during an execution of the shadow program 304, the shadow program 304 updates the abstract state by reading state information from the attestation blob 310, in particular, the vector of Boolean values of the corresponding sample point. Afterwards, the shadow program 304 updates its monitor state according to the abstract state. The corresponding code is added to the shadow program 304.

In other words, a computing entity (e.g., V 202 and/or another computing entity) can add check points to the shadow program 304 and/or original program 402. After, when executing the instrumented program 306, $P_{unstrusted}$ 206 of P 204 can detect the sample point(s). Based on detecting the sample point(s), $P_{unstrusted}$ 206 evaluates the predicates of the sample points and forwards the truth values to the tracer 312. The tracer 312 writes the vector of Boolean values to the attestation blob 310, which is provided to V 202. When executing the shadow program 304, V 202 can detect the sample point(s). Based on detecting the sample point(s), V 202 can update the abstract state by reading state information from the attestation blob 310 (e.g., the vector of Boolean values of the corresponding sample point). V 202

---

Listing 14

```
#define MON_PRV_PRED_positive(x) ((x) > 0)
#define MON_PRV_PRED_threshold(x) ((x) > 1000) /*threshold is 1000 here*/
#define MON_PRV_PRED_equal(x, y) ((x) == (y))
```

---

An abstract state for the predicates $pred_1, \ldots, pred_n$ is a Boolean vector of size n. The ith coordinate corresponds to the truth value of the ith predicate $pred_i$. The predicates are defined with respect to a location of the original program 402. It is assumed that the predicates are defined over program variables that are in the scope of the location. Global program variables are in the scope of all program locations, but program variables can also be local to a function or a for-loop.

The notion of an abstract state can be straightforwardly generalized to non-Boolean values. For instance, it is possible to abstract the integer domain by the abstract domain {negative, zero, positive}. Instead of using predicates, it is possible to use functions that map the values of the program variables to such an abstract domain. Several such abstract domains can be used in an abstract state. A finite abstract domain of size n can encoded by $[\log_2 n]$ bits. For ease of can then update its monitor state according to the abstract state. This will be described in further detail below.

Attestation Blob 310:

In one or more embodiments of the present invention, an attestation blob 310 is extended with a new field that contains the abstract states during an execution of the instrumented program. In the JSON object below, the added field is named "states" and is a list of integers. Each integer encodes the truth values of an abstract state. It is assumed here that there are at most 64 predicates at all sample points.

---

Listing 15

```
{
    "error": n,
    "bits": m,
```

-continued

Listing 15

```
        "conds": [a₁, ..., aᵣ],
        "addrs": [b₁, ..., bₛ],
        "hash": "string",
        "states": [c₁, ..., cₜ]
      }
```

If there are more than 64 predicates at a sample point, then multiple integers can be used to encode a single abstract state. Analogously, if there are fewer predicates, it is possible to encode multiple abstract states into a single integer. For instance, for eight predicates, eight abstract states can be encoded into a single 64-bit integer.

Let mon_prv_write_state be the function that writes an abstract state to the attestation blob, where X0 register contains the vector of truth values as a 64-bit integer. Analogously, the function mon_vrf_read_state reads the next abstract state from the attestation blob 310. The abstract state is returned in the X0 register; again, as a 64-bit integer.

Instrumented Program 306:

In one or more embodiments of the present invention, the instrumented program 306 is extended as follows. In particular, according to the extension, at the sample points, the instrumented program 306 evaluates the predicates and stores the state information. This extension can be implemented by adding code snippets to the source code or by instrumenting the machine code.

The following code snippet in the programming language C evaluates the predicates of a sample point and forwards the resulting abstract state to the tracer 312 by calling the function mon_prv_write_state, which writes it to the attestation blob 310.

Listing 16

```
{
  uint64_t abstract_state = 0;
  MON_PRV_SET(abstract_state, 0, MON_PRV_PRED_1(...));
  MON_PRV_SET(abstract_state, 1, MON_PRV_PRED_2(...));
      .
      .
      .
  MON_PRV_SET(abstract_state, n-1, MON_PRV_PRED_n(...));
  mon_prv_write_state(abstract_state);
}
```

The written abstract state is initialized with 0. The above code snippet makes use of the following C macro, which sets the ith bit in v to 1, provided that b is 1:

Listing 17

```
#define MON_PRV_SET(s, i, b) ((s) |= ((1*(b)) << (i)))
```

Alternatively, trampolines can be added to the instrumented program 306 at the sample points. As above, at a sample point, the predicates are evaluated and the resulting abstract state (in the X0 register) is forwarded to the tracer 312 by the function mon_prv_write_state.

Listing 18

```
STP   X0, X1, [SP, #−16] !   ; store X0 and X1 registers
MOV   X0, XZR               ; initialize abstract state with 0
... ;; evaluate predicate 1 and store truth value in X1 register
ADD   X0, X0, X1, LSL #0    ; X0 += 2^0 * X1
... ;; evaluate predicate 2 and store truth value in X1 register
ADD   X0, X0, X1, LSL #1    ; X0 += 2^1 * X1
.
.
.
... ;; evaluate predicate n and store truth value in X1 register
ADD   X0, X0, X1, LSL #n−1  ; X0 += 2^n−1 * X1
BL    _mon_prv_write_state  ; write abstract state (given in X0
register)
LDP   X0, X1, [SP], #16     ; restore X0 and X1 registers
```

Some additional registers can also be stored and restored, since they are used for evaluating the predicates. The assembly code for their evaluation must be side-effect free. Instead of the X1 register for storing a predicates truth value, another register can be used in other implementations.

Shadow Program 304:

The abstract states are read at the check points of the shadow program 304 by the function mon_vrf_read_state from the given attestation blob 310. Furthermore, a monitor is also added to the shadow program 304, and its state is updated at the check points. The monitor is a deterministic state machine, and it is not required that its state set be finite. The transitions of the monitor take as input the abstract state together with the current check point.

Analogously to the instrumented program, either trampolines are added to the shadow program 304 that read the abstract state from the attestation blob 310 first and then update the monitor state, or the source code of the original program is annotated and updates the monitor state at the check points.

The structure of a monitor state is not fixed. However, typically the monitor state comprises a location, which is, e.g., of type integer. The other state components depend on the property of the shadow program 304. For instance, it could contain the previous check point with the previous abstract state like in the C structure below, where the identifiers for sample and check points are machine integers and an abstract state is represented as a 64-bit unsigned integer.

Listing 19

```
typedef struct {
  int location;
  int check_point;
  uint64_t abstract_state;
} mon_vrf_monitor_t;
```

The shadow program 304 maintains a global program variable monitor_state of this type, which is initialized with the function mon_vrf_init. For the monitor updates, a function mon_vrf_update is used, which takes as arguments the identifier of the sample point and the abstract state (read at the check point from the attestation blob 310). It updates the program variable monitor_state. If the monitor's state machine is given as guarded commands, then the function mon_vrf_update can straightforwardly be implemented as an "if-then-else program."

For reducing the number of if-statements in the function mon_vrf_update, it is possible to implement the transitions from a monitor state (or parts thereof, e.g., location and check point) in separate functions and indirectly call the respective transition function by maintaining a state variable with a function pointer to a transition function.

Finally, for checking whether the property is fulfilled, a function mon_vrf_is_accepting is used for checking whether the final monitor state is accepting. Typically, this function checks whether the monitor state is in a certain location. But, its return value can also depend on some values of the final abstract state.

EXAMPLES

For illustration, consider the following example. Suppose that the original program 402 includes if-statements of the following two forms:

---

Listing 20

```
if (authorized) {              if (authorized) {
   /* do something critical */    /* do something critical */
   ...                            ...
}                              } else {
                                  /* do something non-critical */
                                  ...
                               }
```

---

Here, authorized is a global program variable, which is set at the beginning of a requested operation and should not change during the execution of the operation. These if-statements can occur nested in an execution.

With the shadow program 304, a goal is to additionally attest that either all if-branches with respect to the variable authorized are taken or none. Thus, the Boolean program variable authorized does not change its value during an execution. This can happen because of the original program 402 is buggy or an attacker changed its value during an execution. In the following, a corresponding monitor for the shadow program to check this property is described.

Two kinds of check points are added, in particular BEFORE and TAKEN. The BEFORE check points are directly before the if-statements. The TAKEN check points are at the start of the then-branch. FIG. 12 shows the monitor's underlying finite-state machine 1200. The monitor's initial location is 0 (state 1202). Its accepting locations are states 0, 1, 2, and 4 (states 1204, 1206, and 1210). The third state 1208 and the fifth state 1212 are also shown.

The implementation of the monitor state is a very simple for this example. It only includes the location.

---

Listing 21

```
typedef struct {
   int location;
} mon_vrf_monitor_t;
mon_vrf_monitor_t_monitor_state;
```

---

The implementation of the functions mon_vrf_init and mon_vrf_is_accepting is straight-forward. The monitor's transition function is implemented by the function mon_vrf_update. Since the transitions only depend on the monitor's location and the check point, the function's argument for the abstract state is omitted.

---

Listing 22

```
void mon_vrf_udate(int chkpt) {
   switch (monitor_state.location) {
   case 0:
      switch (chkpt) {
      case BEFORE:
         monitor_state.location = 1;
         return;
      }
      break;
   case 1:
      switch (chkpt) {
      case BEFORE:
         monitor_state.location = 4;
         return;
      case TAKEN :
         monitor_state.location = 2;
         return;
      }
      break;
   case 2:
      switch (chkpt) {
      case BEFORE:
         monitor_state.location = 3;
         return;
      }
      break;
   case 3:
      switch (chkpt) {
      case TAKEN:
         monitor_state.location = 2;
         return;
      }
      break;
   case 4:
      switch (chkpt) {
      case BEFORE:
         monitor_state.location = 4;
         return;
      }
      break;
   }
   /* If no case applies, enter the trap state, i.e., location 5. * /
   monitor_state.location = 5;
}
```

---

The check point annotations for the shadow program 304 in the original program 402 are as follows. Unique identifiers are not assigned to the check points. Instead, there is a BEFORE check point before each of the if-statements and a TAKEN check point at the beginning of the body of each of the if-statements. The monitor state is updated accordingly at these check points.

---

Listing 23

```
#ifdef CHECKPOINT              #ifdef CHECKPOINT
   mon_vrf_update(BEFORE);        mon_vrf_update(BEFORE);
#endif                         #endif
   if (authorized) {              if (authorized) {
#ifdef CHECKPOINT              #ifdef CHECKPOINT
   mon_vrf_update(TAKEN);         mon_vrf_update(TAKEN);
#endif                         #endif
   /* do something critical */    /* do something critical */
   ...                            ...
}                              } else {
                                  /* do something non-
                               critical */
                                  ...
                               }
```

---

Recall that the monitor's transitions are independent from an abstract state, that is, they only depend on the program location and monitor location. Hence, the function mon_vrf_read_state is not used to read any abstract state from the attestation blob. Furthermore, it is possible to inline the function mon_vrf_update, where the switch-statements on the local program variable chkpt can be simplified, since at most one case (BEFORE or TAKEN) can apply. Furthermore, the order of the cases be optimized. The most frequent cases should occur before the less frequent cases. In this example, the cases for the locations 2, 3, and 4 should occur before the cases 0 and 1.

Nothing needs to be done at the corresponding sample points of the instrumented program 306. In particular, no predicates are evaluated and no abstract states are written to the attestation blob 310. The reason is that the monitor's transitions only depend on the program location and are independent from the program state.

In a second example, sample points are added with predicates to the original program 402. Suppose that the original program 402 makes a call to the function is_user_authorized for setting the Boolean program variable authorized. It is assumed that this function is called at most once. Sample points (with the identifier RETURN) are added to the function's return statements. Each such sample point includes a predicate with the function's return value.

---

Listing 24

---

```
bool is_user_authorized(...) {
  .
  .
  .
#ifdef SAMPLEPOINT
  {
     uint64_t abstract_state = 0;
     MON_PRV_SET(abstract_state, 0,
        true);   /* predicate identical to return
expression */
     mon_prv_write_state(abstract_state);
  }
#endif
  return true;
  .
  .
  .
}
```

---

At the corresponding check points in the shadow program 304, the monitor updates to a state according to the predicate's truth value.

---

Listing 25

---

```
#ifdef CHECKPOINT
  {
     uint64_t abstract_state = mon_vrf_read( ) ;
     mon_vrf_update(RETURN, abstract_state)
  }
#endif
```

---

It is noted that the function mon_vrf_update takes now a second argument for the predicates.

Figure 13:
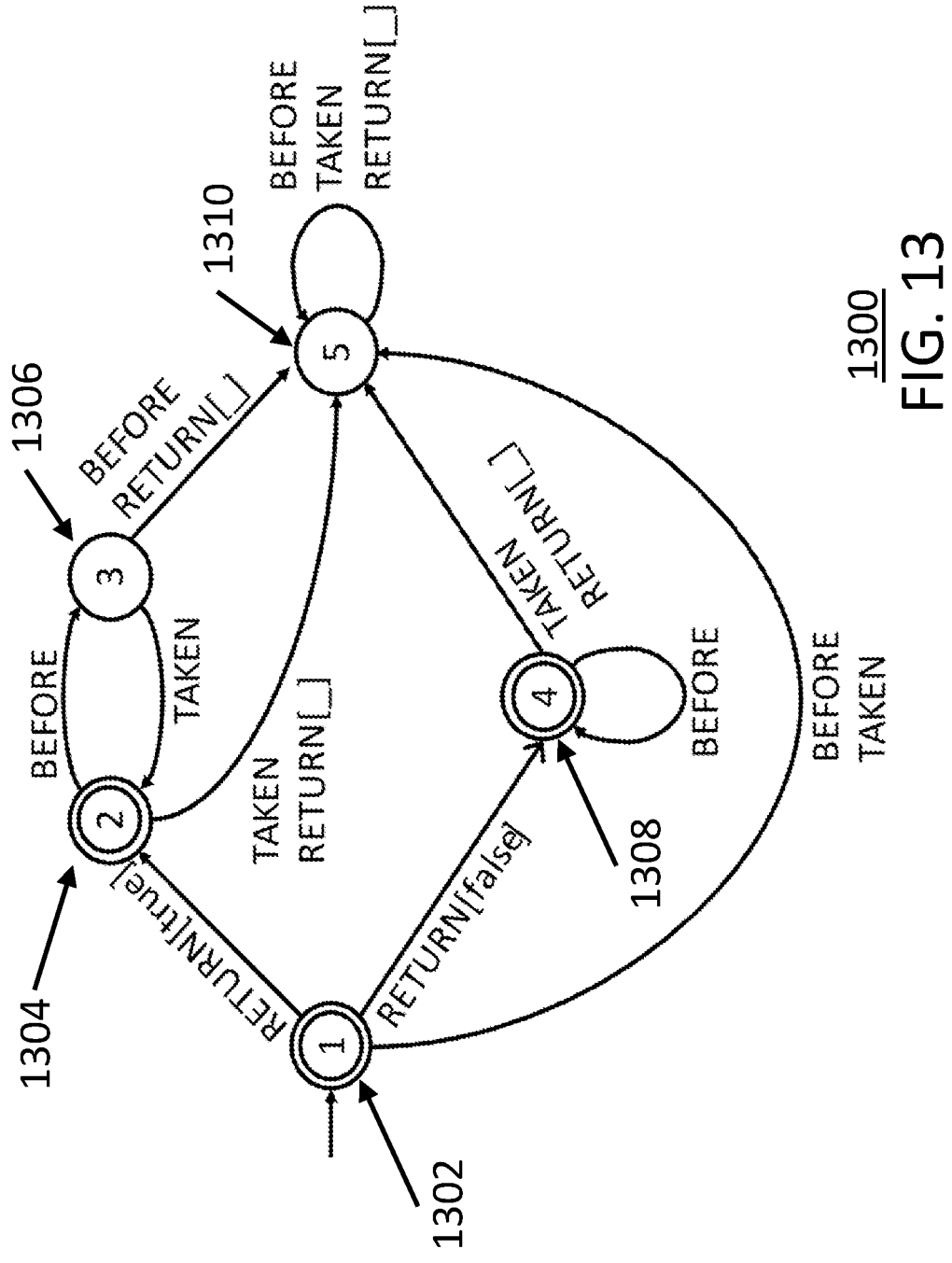
FIG. 13 illustrates the second example of the updated finite-state machine.

The sample and check points are carried over from the first example. At such a check point, the monitor checks whether the correct branch was taken according to the return value of the is_user_authorized function. FIG. 13 shows the updated finite-state machine 1300 for this example. The states 1302-1310 are shown. The monitor also checks that the function is_user_authorized is called before branching on the Boolean program variable authorized in one of the if-statements. If the state 1 1302 is non-accepting, then the monitor also checks that the function is_user_authorized is called, even when none of the if-statements with the Boolean program variable authorized are visited in an execution. The implementation of the function mon_vrf_update is similar to the first example.

In an embodiment, the present invention provides a method for attesting program executions remotely, the method comprising the following steps:
   1) From a given program, build an abstract program that mimics the program's control flow as a shadow program.
   2) Collect information about the control-flow operations executed by the program, in particular by constructing the instrumented program from the given program and executing it. The collected information is stored in an attestation blob.
   3 Execute the abstract program with the collected information. During this execution translate addresses between the abstract program and the program. As discussed above, the abstract program, which is the shadow program, reads the collected information from an attestation blob and obtains mappings for translating return addresses and target addresses of indirect calls and jumps.
   4) Check output of the abstract program.

In another embodiment, the steps 1) and 3) can be replaced with steps that use an interpreter instead of an abstract program. In this case, step 2) would be unaltered. Namely, in the replaced step 1), the original program 402 or the instrumented program 306 is directly used (e.g., obtaining and using the original program 402 or the instrumented program 306), and in the replaced step 3) an interpreter is used that replays and checks the execution (by following the collected information of the attestation blob 310) of the instrumented program 306. The normalization/mappings between the instruction addresses are provided if address randomization like ASLR is used.

For instance, the interpreter can iteratively read the instructions of the disassembled original program and follow the execution by using the information from the attestation blob. In the following, the mappings related (normalized) addresses of the instrumented program 306 and the original program 402 are assumed. If the current instruction is a conditional branch, the interpreter's next instruction is according to the truth value from the attestation blob, e.g., whether the branch is taken or not. If the current instruction is an indirect call or jump, the interpreter's next instruction is the instruction at the (normalized) target address, which the interpreter obtains from the target address stored in the attestation blob and the mapping of the (normalized) target addresses. If the current instruction is a return instruction, the interpreter's next instruction is obtained from the interpreter's stack that stores (normalized) return addresses. Furthermore, the interpreter updates the return hash value accordingly by using the return address mapping. For other control-flow instructions (e.g., direct calls and jumps), the interpreter sets the next instruction as expected. The remaining instructions can be skipped by the interpreter. It is noted that the interpreter can also use the instrumented program. In this case, the normalized addresses in the attestation blob can be used directly. However, control-flow instructions related to the trampolines can be ignored by the interpreter.

In contrast to existing technology such as OAT, where the verifier uses an interpreter on the instrumented program, embodiments of the present invention require that the verifier 202 does not use ASLR and therefore address locations of the executed instructions at the prover 204 match with the addresses given to the interpreter. For instance, OAT assumes that the prover P does not use ASLR. In contrast, in embodiments of the present invention, the prover P 204 can use ASLR when executing the instrumented program 306. The interpreter and (used by the verifier V 202) described above (and also the shadow program 304) handles the addresses (e.g., target and return) correctly by using the mappings.

Embodiments of the present invention provide for the following improvements and technical advantages over existing technology:

1) Providing a native executable (shadow/abstract program) that checks the correct executions of a (instrumented) program. A technical advantage here is improved computational performance since it allows the verifier 202 to attest executions is faster and in a more computationally efficient manner.

2) Providing address normalization and address mappings between the (instrumented) program 306 and the abstract/shadow program 304. A technical advantage here is the provision of a prerequisite for the prover 204 and verifier 202 to execute different programs; only the control flows of their programs must match/relate. Additionally, this allows the prover 204 and the verifier 202 to execute PIC and to use ASLR.

3) Providing for the checking of properties about executions of the (instrumented) program 306 by adding monitors to the abstract/shadow program 304. A technical advantage here is the provision of broader scope since it allows the verifier 202 to not only attest the control flow of an execution, but also, for example, to additionally check properties on the program's state during executions.

4) Providing for minimized computational overhead for the verifier 202 for attesting executions.

5) Providing for attestation of a wide range of properties, e.g., safety properties like invariants. Further, attestation is not limited to the program's control flow.

Figure 14:
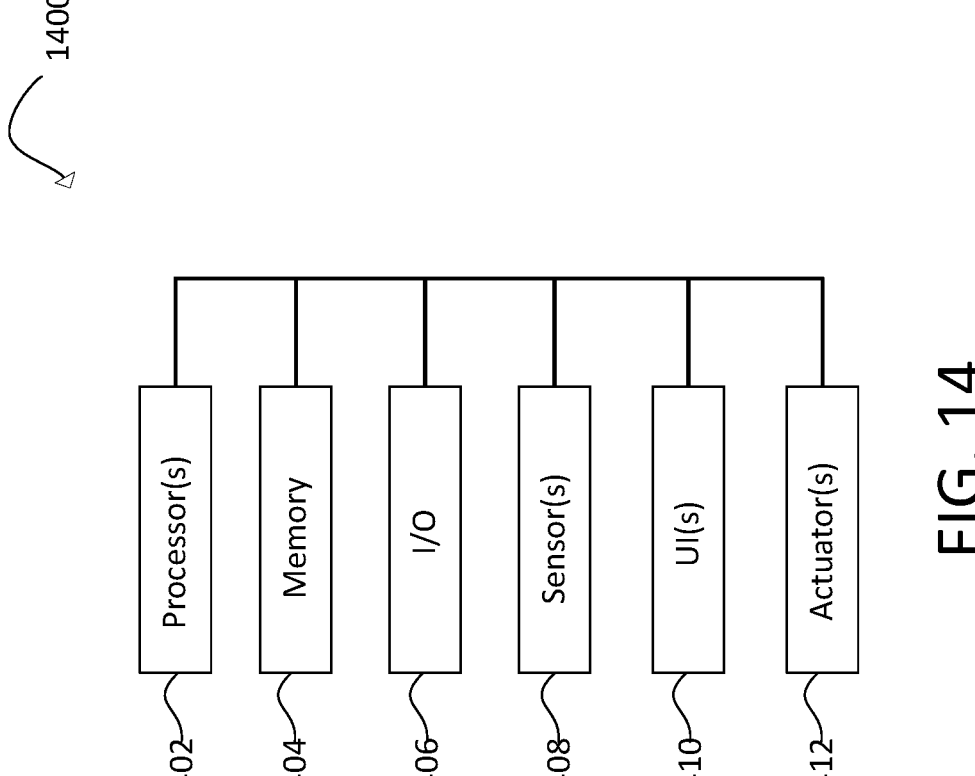
FIG. 14 is a block diagram of an exemplary processing system, which can be configured to perform any and all operations disclosed herein.

Referring to FIG. 14, a processing system 1400 can include one or more processors 1402, memory 1404, one or more input/output devices 1406, one or more sensors 1408, one or more user interfaces 1410, and one or more actuators 1412. Processing system 1400 can be representative of each computing system disclosed herein.

Processors 1402 can include one or more distinct processors, each having one or more cores. Each of the distinct processors can have the same or different structure. Processors 1402 can include one or more central processing units (CPUs), one or more graphics processing units (GPUs), circuitry (e.g., application specific integrated circuits (ASICs)), digital signal processors (DSPs), and the like. Processors 1402 can be mounted to a common substrate or to multiple different substrates.

Processors 1402 are configured to perform a certain function, method, or operation (e.g., are configured to provide for performance of a function, method, or operation) at least when one of the one or more of the distinct processors is capable of performing operations embodying the function, method, or operation. Processors 1402 can perform operations embodying the function, method, or operation by, for example, executing code (e.g., interpreting scripts) stored on memory 1404 and/or trafficking data through one or more ASICs. Processors 1402, and thus processing system 1400, can be configured to perform, automatically, any and all functions, methods, and operations disclosed herein. Therefore, processing system 1400 can be configured to implement any of (e.g., all of) the protocols, devices, mechanisms, systems, and methods described herein.

For example, when the present disclosure states that a method or device performs task "X" (or that task "X" is performed), such a statement should be understood to disclose that processing system 1400 can be configured to perform task "X". Processing system 1400 is configured to perform a function, method, or operation at least when processors 1402 are configured to do the same.

Memory 1404 can include volatile memory, non-volatile memory, and any other medium capable of storing data. Each of the volatile memory, non-volatile memory, and any other type of memory can include multiple different memory devices, located at multiple distinct locations and each having a different structure. Memory 1404 can include remotely hosted (e.g., cloud) storage.

Examples of memory 1404 include a non-transitory computer-readable media such as RAM, ROM, flash memory, EEPROM, any kind of optical storage disk such as a DVD, a Blu-Ray® disc, magnetic storage, holographic storage, a HDD, a SSD, any medium that can be used to store program code in the form of instructions or data structures, and the like. Any and all of the methods, functions, and operations described herein can be fully embodied in the form of tangible and/or non-transitory machine-readable code (e.g., interpretable scripts) saved in memory 1404.

Input-output devices 1406 can include any component for trafficking data such as ports, antennas (i.e., transceivers), printed conductive paths, and the like. Input-output devices 1406 can enable wired communication via USB®, DisplayPort®, HDMI®, Ethernet, and the like. Input-output devices 1406 can enable electronic, optical, magnetic, and holographic, communication with suitable memory 1406. Input-output devices 1406 can enable wireless communication via WiFi®, Bluetooth®, cellular (e.g., LTE®, CDMA®, GSM®, WiMax®, NFC®), GPS, and the like. Input-output devices 1406 can include wired and/or wireless communication pathways.

Sensors 1408 can capture physical measurements of environment and report the same to processors 1402. User interface 1410 can include displays, physical buttons, speakers, microphones, keyboards, and the like. Actuators 1412 can enable processors 1402 to control mechanical forces.

Processing system 1400 can be distributed. For example, some components of processing system 1400 can reside in a remote hosted network service (e.g., a cloud computing environment) while other components of processing system 1400 can reside in a local computing system. Processing system 1400 can have a modular design where certain modules include a plurality of the features/functions shown in FIG. 14. For example, I/O modules can include volatile memory and one or more processors. As another example, individual processor modules can include read-only-memory and/or local caches.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A computer-implemented method for remotely attesting program executions, comprising:
    obtaining, by a verifier computing entity, a program associated with an original program;
    obtaining, by the verifier computing entity, collected information associated with control-flow operations executed by an instrumented program, wherein the instrumented program is a variation of the original program;
    executing, by the verifier computing entity, the program associated with the original program based on the collected information; and
    checking, by the verifier computing entity, an output of the program associated with the original program.

2. The computer-implemented method of claim 1, wherein obtaining the program associated with the original program comprises obtaining a shadow program that mimics a control flow of the original program, and wherein executing the program associated with the original program comprises executing the shadow program based on the collected information.

3. The computer-implemented method of claim 2, wherein a prover computing entity comprises a first execution environment and a second execution environment, wherein the first execution environment executes the instrumented program and invokes a tracer from the second execution environment to collect the collected information in an attestation blob, and wherein the prover computing entity provides the attestation blob comprising the collected information to the verifier computing entity.

4. The computer-implemented method of claim 2, further comprising:
    building the instrumented program by incorporating one or more trampolines into the original program, wherein each of the one or more trampolines is associated with the control-flow operations of the original program; and
    building the shadow program by modifying the control-flow operations of the original program.

5. The computer-implemented method of claim 4, wherein building the instrumented program comprises:
    including a new initialization step within the original program, wherein the new initialization step is configured to establish a connection to a tracer of a trusted environment of a prover computing entity;
    including one or more attestation steps within the original program, wherein the one or more attestation steps are configured to notify the tracer of a request and notify the tracer of completion of the request; and
    modifying a server request step by incorporating the one or more trampolines.

6. The computer-implemented method of claim 5, wherein the one or more trampolines is associated with a conditional branch instruction from the original program, and wherein the collected information indicates a truth value of the conditional branch that is obtained based on the one or more trampolines calling a first library function and invoking the tracer.

7. The computer-implemented method of claim 5, wherein the one or more trampolines is associated with an indirect call or jump instruction from the original program and a return instruction from the original program, and wherein the collected information indicates a target address that is obtained based on the one or more trampolines a second library function and invoking the tracer and a return address that is obtained based on the one or more trampolines a third library function and invoking the tracer.

8. The computer-implemented method of claim 2, wherein executing the shadow program comprises:
    initializing one or more memory address mappings between the shadow program and the instrumented program;
    awaiting an attestation blob comprising the collected information; and
    based on receiving the attestation blob from the verifier computing entity, attesting execution of the instrumented program by a prover computing entity.

9. The computer-implemented method of claim 8, wherein initializing the one or more memory address mappings comprises:
    obtaining a first mapping that translates target addresses of indirect calls and jumps of the instrumented program to corresponding target addresses of the shadow program; and
    obtaining a second mapping that translates return addresses of the shadow program to corresponding return addresses of the instrumented program.

10. The computer-implemented method of claim 9, wherein attesting the execution of the instrumented program comprises: translating one or more addresses between the shadow program and the original program based on at least one of the first mapping and the second mapping, and wherein checking the output of the shadow program is based on translating the one or more addresses.

11. The computer-implemented method of claim 8, wherein attesting the execution of the instrumented program comprises:
    based on detecting a conditional branch instruction, executing a first call function to obtain a truth value associated with the conditional branch instruction from the attestation blob;
    performing a test-and-branch instruction based on the truth value to test the conditional branch; and
    determining a result of the test of the conditional branch, wherein the output of the shadow program indicates the result of the test.

12. The computer-implemented method of claim 8, wherein attesting the execution of the instrumented program comprises:
    based on detecting an indirect call or jump instruction, executing a second call function to read a next target address into a register from the attestation blob, translate the next target address into a corresponding target address of the shadow program, and return the corresponding target address in a register;
    based on detecting a return instruction, executing a third call function to translate a return address of the shadow program into a corresponding return address of the instrumented program, update a hash value with the corresponding return address, and comparing the hash value with a hash value from the attestation blob; and determining one or more results of the indirect call or jump instruction and the return instruction based on executing the second call function and the third call function.

13. The computer-implemented method of claim 2, wherein the verifier computing entity is a controller that coordinates operation of at least one of: a plurality of robotic devices, a plurality of internet of things (IoT) devices, and a cloud server, and wherein, based on the output of the shadow program, one or more instructions are provided to reset the at least one of: the plurality of robotic devices, the plurality of IoT devices, and the cloud server.

14. The computer-implemented method of claim 1, wherein obtaining the program associated with the original program comprises:

obtaining the original program or the instrumented program; and using an interpreter that directly uses the original program or the instrumented program, and wherein executing the program associated with the original program comprises using the interpreter that replays and checks an execution of the instrumented program based on the collected information.

15. A computer system for remotely attesting program executions, the system comprising one or more hardware processors, which, alone or in combination, are configured to provide for execution of the following steps:

obtaining a program associated with an original program;

obtaining collected information associated with control-flow operations executed by an instrumented program, wherein the instrumented program is a variation of the original program;

executing the program associated with the original program based on the collected information; and checking an output of the program associated with the original program.

16. A tangible, non-transitory computer-readable medium having instructions thereon which, upon being executed by one or more processors, alone or in combination, provide for execution of a method for remotely attesting program executions comprising the following steps:

obtaining a program associated with an original program;

obtaining collected information associated with control-flow operations executed by an instrumented program, wherein the instrumented program is a variation of the original program;

executing the program associated with the original program based on the collected information; and checking an output of the program associated with the original program.

* * * * *